United States Patent
Yoshiuchi et al.

(10) Patent No.: US 10,144,131 B2
(45) Date of Patent: Dec. 4, 2018

(54) OPERATION MONITORING SERVER AND OPERATION MONITORING SYSTEM

(71) Applicant: Hitachi, Ltd., Chiyoda-ku, Tokyo (JP)

(72) Inventors: Hideya Yoshiuchi, Tokyo (JP); Seishi Hanaoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/637,691

(22) Filed: Jun. 29, 2017

(65) Prior Publication Data

US 2018/0001473 A1    Jan. 4, 2018

(30) Foreign Application Priority Data

Jun. 30, 2016 (JP) .................... 2016-129551

(51) Int. Cl.
*B25J 19/00* (2006.01)
*B25J 9/16* (2006.01)
*G05B 19/048* (2006.01)
*G05B 23/02* (2006.01)

(52) U.S. Cl.
CPC .......... *B25J 9/1674* (2013.01); *B25J 9/1602* (2013.01); *G05B 19/048* (2013.01); *G05B 23/0208* (2013.01)

(58) Field of Classification Search
CPC ................................ G05B 15/02; H04W 4/02
See application file for complete search history.

(56) References Cited

U.S. PATENT DOCUMENTS

| 2012/0284759 | A1  | 11/2012 | Lv et al. |
| 2015/0170023 | A1* | 6/2015  | Chatterjee ............... G06N 3/08 706/16 |
| 2016/0117871 | A1* | 4/2016  | McClellan ............ G01S 5/0027 701/31.5 |

FOREIGN PATENT DOCUMENTS

| JP | 2013-516854 A | 5/2013 |
| JP | 2015-153370 A | 8/2015 |

\* cited by examiner

*Primary Examiner* — Karen Masih
(74) *Attorney, Agent, or Firm* — Crowell & Moring LLP

(57) ABSTRACT

An operation monitoring server includes a storage apparatus configured to store instructions, and a processor configured to operate based on the instructions. The processor is configured to acquire state information on at least one of a monitoring target device or a base location in which the monitoring target device is placed. The processor is configured to select, based on the acquired state information, one of a plurality of service request processing apparatus each having a function of processing a service request received from the monitoring target device.

16 Claims, 20 Drawing Sheets

364 — BASE LOCATION BASIC INFORMATION DB

| BASE LOCATION IDENTIFIER | FIXED APP LIST | | | |
|---|---|---|---|---|
| | APP IDENTIFIER1 | APP IDENTIFIER 2 | ... | APP IDENTIFIER L |

365 — BASE LOCATION RESOURCE DB

| BASE LOCATION IDENTIFIER | NW BANDWIDTH | NW BANDWIDTH USAGE RATE | RUNNING APP LIST | | |
|---|---|---|---|---|---|
| | | | APP IDENTIFIER | CPU USAGE RATE | CONSUMED NW BANDWIDTH |

366 — BASE LOCATION STATE DB

| BASE LOCATION IDENTIFIER | BASE LOCATION MAP | BASE LOCATION TASK SCHEDULE | | | |
|---|---|---|---|---|---|
| | | PLACE NAME | START TIME | END TIME | TASK DETAILS |

367 — ROBOT COUPLING INFORMATION DB

| ROBOT IDENTIFIER | APP IDENTIFIER | CONSUMED NW BANDWIDTH | CPU USAGE RATE |
|---|---|---|---|

368 — ROBOT STATE DB

| ROBOT IDENTIFIER | BASE LOCATION MAP | PLACE NAME | X-COORDINATE | Y-COORDINATE |
|---|---|---|---|---|

369 — ROBOT RESOURCE DB

| ROBOT IDENTIFIER | BASE LOCATION IDENTIFIER | NW BANDWIDTH | NW BANDWIDTH USAGE RATE | RUNNING APP LIST | | |
|---|---|---|---|---|---|---|
| | | | | APP IDENTIFIER | CPU USAGE RATE | CONSUMED NW BANDWIDTH |

APP COUPLING INFORMATION DB

| BASE LOCATION IDENTIFIER | APP IDENTIFIER | CONSUMED NW BANDWIDTH | CPU USAGE RATE |
|---|---|---|---|
| | | | |

766

ROBOT COUPLING INFORMATION DB

| BASE LOCATION IDENTIFIER | ROBOT IDENTIFIER | APP IDENTIFIER | CONSUMED NW BANDWIDTH | CPU USAGE RATE |
|---|---|---|---|---|
| | | | | |

FIG. 7

DETERMINATION CONDITION EDIT SCREEN

| | | | | | |
|---|---|---|---|---|---|
| APPLICATION NAME | TASK OF SERVING CUSTOMER IN BANK | | | | CLOSE |
| CHANGE TYPE | ● CHANGEABLE ○ FIXED | DEPLOYMENT BASE LOCATION (IF FIXED) | | | |
| CHANGE DIRECTION | ROBOT → APP CONTROL SERVER ▼ | | | | |
| CHANGE DETERMINATION CONDITION 1 | CPU USAGE RATE OF ROBOT ▼ | 10 % | EQUAL TO OR GREATER THAN ▼ | | |
| CHANGE DETERMINATION CONDITION 2 | PLACE OF ROBOT ▼ | SPACE FOR SERVING CUSTOMER | EQUAL TO ▼ | | |
| ADD CONDITION ⊕ | | | | | |

ADD CONDITION    CLEAR

| APPLICATION NAME | CHANGE TYPE | CHANGE DIRECTION | DETERMINATION CONDITION 1 | DETERMINATION CONDITION 2 | DETERMINATION CONDITION 3 |
|---|---|---|---|---|---|
| TASK OF SERVING CUSTOMER IN BANK | CHANGEABLE | ROBOT → APP CONTROL SERVER | CPU USAGE RATE OF ROBOT IS EQUAL TO OR GREATER THAN 10% | PLACE OF ROBOT IS EQUAL TO SPACE FOR SERVING CUSTOMER | |
| SPEECH RECOGNITION PROCESSING | CHANGEABLE | APP CONTROL SERVER → CENTRAL APP CONTROL SERVER | CPU USAGE RATE OF APP CONTROL SERVER IS EQUAL TO OR GREATER THAN 90% | BANDWIDTH USED BY APP CONTROL SERVER IS EQUAL TO OR LESS THAN 20 Mbps | |
| TASK OF SERVING CUSTOMER IN BANK | CHANGEABLE | APP CONTROL SERVER → CENTRAL APP CONTROL SERVER | CPU USAGE RATE OF CENTRAL APP CONTROL SERVER IS EQUAL TO OR LESS THAN 40% | PLACE OF ROBOT IS OTHER THAN SPACE FOR SERVING CUSTOMER | TASK IN PLACE IS OTHER THAN TASK OF SERVING CUSTOMER |
| ... | ... | ... | ... | ... | ... |

*FIG. 20*

OPERATION MONITORING SERVER AND OPERATION MONITORING SYSTEM

CLAIM OF PRIORITY

The present application claims priority from Japanese patent application JP2016-129551 filed on Jun. 30, 2016, the content of which is hereby incorporated by reference into this application.

BACKGROUND

The subject matter disclosed herein relates to an operation monitoring technology for a movable device.

An internet-of-things (IoT) technology for coupling all devices to the Internet and providing various services is becoming widespread. As devices (IoT devices) compatible with IoT, there exist devices of various types ranging from a sensor or other such low-function terminal configured to conduct only routine processing to a robot or other such high-function terminal configured to provide functions that can be changed by software.

While the number of devices coupled to the Internet is rapidly increasing, in order to achieve a high-quality service when a given function is implemented through use of those devices, load balancing and/or reduction in response time of an application program (hereinafter referred to as "application" or "APP") are one of the issues to be solved.

In order to solve this issue, it is effective to examine how applications are to be deployed and/or how operation functions and monitoring functions are to be provided to the devices.

As the related art, in JP 2015-153370 A, there is disclosed a technology for conducting load balancing when an application is executed among a plurality of data centers.

In JP 2013-516854 A, there is disclosed a technology for deploying content in a distributed manner to any one of a data center and an edge server in an IPTV system.

SUMMARY

In regard to the robot or other such movable device, a function to be desired or a function to be provided may differ depending on staying places before and after the movement, an operating time slot, and/or other such external condition (state information). Therefore, it is effective to take those external conditions (state information) into consideration in terms of the load balancing and/or the reduction in response time, but the state information is not taken into consideration in the related art.

In other words, in JP 2015-153370 A, a server in the data center mainly executes the application, and only a CPU load, a bandwidth, and other such computer resources are taken into consideration as selection criteria for the server.

In the IPTV system disclosed in JP 2013-516854 A, media content is deployed in a distributed manner, but it is not disclosed to provide a service by deploying any other application to the data center or the edge server. In addition, the above-mentioned external conditions (state information) are not taken into consideration.

Therefore, there are demands for a method of deploying applications on various devices and/or a method of providing a device with an operation function and a monitoring function, which serve to achieve a high-quality service in consideration of state information.

Disclosed examples are an operation monitoring system and a operation monitoring server included in the operation monitoring system. At least one of a monitoring target device or a service request processing apparatus having a function of processing a service request received from the monitoring target device is placed in each of a plurality of base locations coupled to one another by a network. The operation monitoring server placed is in a base location of the plurality of base locations and configured to monitor operations of monitoring target devices placed in the plurality of base locations.

A first service request processing apparatus is placed in one of the plurality of base locations in which a first monitoring target device is placed. The first monitoring target device is configured to transmit state information on the first monitoring target device to the operation monitoring server, and/or the first service request processing apparatus is configured to transmit state information on the one of the plurality of base locations to the operation monitoring server. The operation monitoring server is configured to acquire the transmitted state information, and select, based on the acquired state information, one of a plurality of service request processing apparatus each having a function of processing a service request received from the first monitoring target device.

Further, at least one of the first monitoring target device or the first service request processing apparatus may be configured to transmit resource information on the at least one of the first monitoring target device or the first service request processing apparatus to the operation monitoring server. The operation monitoring server may be configured to acquire the transmitted resource information, and select the one of the plurality of service request processing apparatus, which is to serve the first monitoring target device, based on the state information and the acquired resource information.

Further, when the selected one of the plurality of service request processing apparatus is different from an active one of the plurality of service request processing apparatus registered in the first monitoring target device, the operation monitoring server may notify the first monitoring target device that the active one of the plurality of service request processing apparatus is to be changed.

An operation monitoring apparatus and an operation monitoring system, which are disclosed herein, enable a high-quality service to be provided.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a block diagram illustrating the structure of data managed by an APP control server;

FIG. 7 is a block diagram illustrating the structure of data managed by the central APP control server;

FIG. 20 depicts an example of an editing screen of a determination condition for changing a service request processing apparatus.

DETAILED DESCRIPTION OF THE EMBODIMENTS

Figure 1:
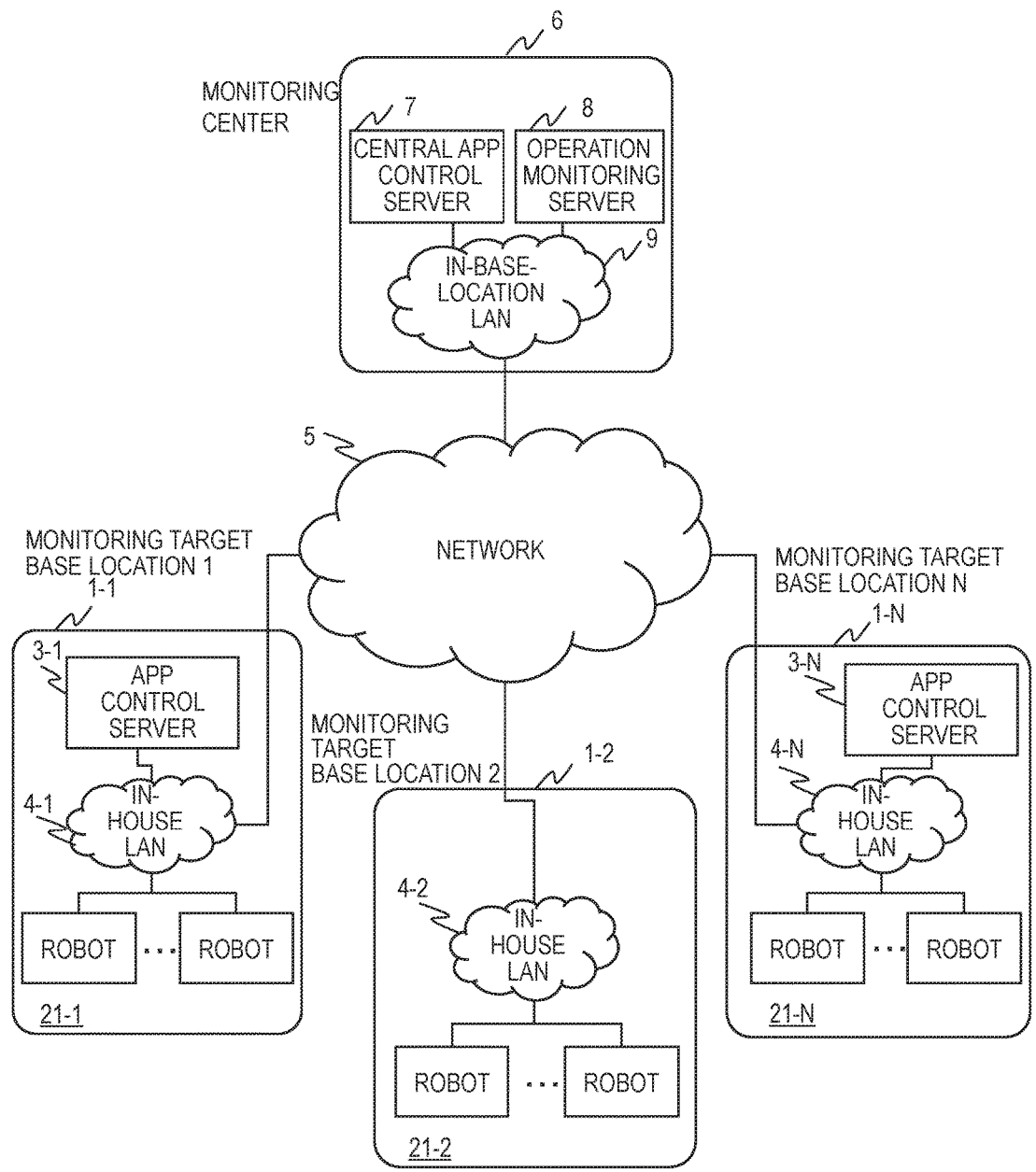
FIG. 1 is a block diagram of a device operation monitoring system according to one embodiment

FIG. 1 is an example of a configuration of an operation monitoring system according to an embodiment of the present invention.

The operation monitoring system is configured to set base locations in which devices are placed as monitoring target base locations (1-1 to 1-N), and to monitor monitoring target devices placed in the monitoring target base locations. The placed device is configured to provide a service to a user through various applications.

Various forms are conceivable as the monitoring target devices, but the following description is directed to autonomously movable information processing devices called robots 21-1 to 21-N (hereinafter referred to generically as "robot 21").

The robot 21 includes a control terminal, and is therefore capable of not only controlling a system of the robot 21 itself but also executing an application to provide a service to the user in the same manner as the server, but the control terminal of the robot 21 is not specialized for executing the application unlike the server. Therefore, a CPU, an internal storage (memory), an external storage (storage), and other such computer resources available for executing the application are not so abundant as those of the server.

Therefore, the robot 21 may depend on the server placed in the outside for the execution of the application. In this case, the robot 21 issues a service request to the server placed in the outside, receives a service processing result from the server, and provides the service to the user. In regard to a site for placing the server, there are two methods including a method of placing the server in the same monitoring target base location in which the relevant robot 21 is placed and a method of placing the server in a data center or a monitoring center.

The servers placed in the monitoring target base locations (1-1 to 1-N) are referred to as "application control servers (3-1 to 3-N)" (hereinafter referred to collectively as "APP control server 3"), and the server placed in a monitoring center 6 being a monitoring base location is referred to as a central application control server 7 (hereinafter referred to as "central APP control server 7"). Those servers each function as a service request processing apparatus.

In each monitoring target base location 1, the robot 21 and the APP control server 3 are coupled to each other through one of in-house LANs (4-1 to 4-N) being LANs within the base locations. In the monitoring center 6, an operation monitoring server 8 and the central APP control server 7 are coupled to each other through an in-base-location LAN 9. The robot 21, the APP control server 3, and the central APP control server 7 are coupled to one another through the in-house LAN 4 or the in-base-location LAN 9 and an inter-base-location network 5.

The robot 21, the APP control server 3, and the central APP control server 7, which are placed in each base location, are controlled by the operation monitoring server 8 configured to centrally manage devices and servers within the device operation monitoring system. The robot 21, the APP control server 3, and the central APP control server 7 are configured to transmit various kinds of information necessary for operation monitoring to the operation monitoring server 8.

Next, each of the apparatus that form the system is described in detail.

Figure 2:
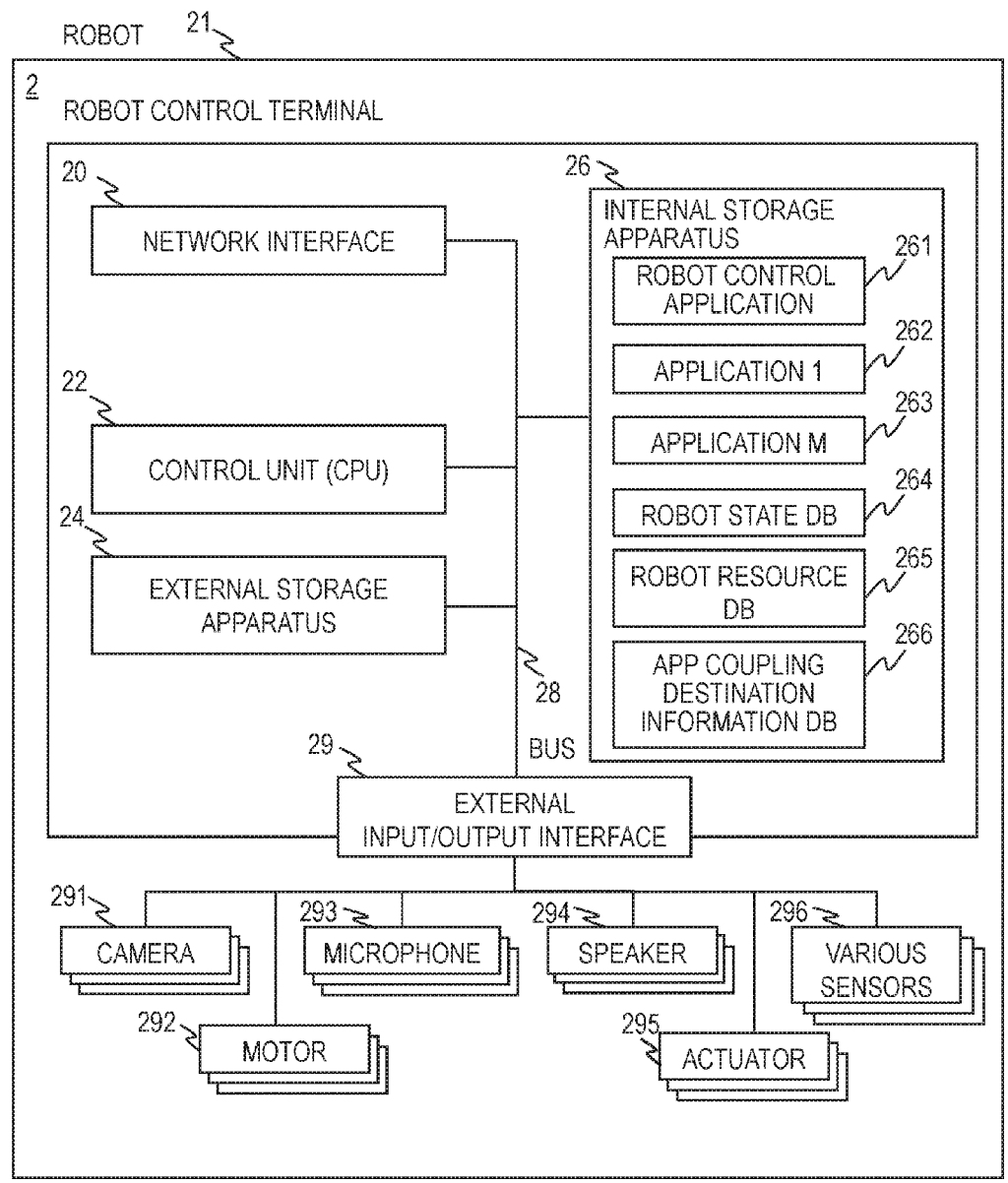
FIG. 2 is a block diagram illustrating the structure of a robot.

FIG. 2 is an illustration of an apparatus structure of the robot 21. The robot 21 includes: a robot control terminal 2; and a camera 291, a motor 292, a microphone 293, a speaker 294, an actuator 295, and various sensors 296, which are devices to be controlled. The robot control terminal 2 and the devices to be controlled are coupled to each other through an external input/output interface 29 of the robot control terminal 2.

The robot control terminal 2 includes a control unit (CPU) 22, a memory or other such internal storage apparatus 26, a hard disk drive or other such external storage apparatus 24, and a network interface 20, which are coupled to one another through a bus 28, and are configured to communicate to/from one another through the network interface 20, the in-house LAN 4, and the inter-base-location network 5.

The internal storage apparatus 26 includes a robot control application 261 configured to control a system, a posture, a movement, and the like of the robot 21. The internal storage apparatus 26 further includes functions other than the control of the robot 21 itself, for example, various applications (262 and 263) for information collection using a sensor and for position estimation. Among the various applications, a plurality of applications can be activated depending on functions required by the robot 21.

In addition to those applications, the robot 21 includes a robot state database (DB) 264 for managing information relating to a state of the robot, the robot resource DB 265 for managing a resource use status of the robot 21, and an APP coupling destination information DB 266 for managing coupling destinations of the various applications used by the robot 21.

Those respective databases may be stored in the external storage apparatus 24 depending on the scale of the system, the processing performance of the robot control terminal 2, and the like. Those databases are read and written by the robot control application 261 installed in the internal storage apparatus 26.

The control unit (CPU) 22 is configured to access the robot control application 261 stored in the internal storage apparatus 26, to thereby implement a function of controlling the robot 21.

Figure 3:
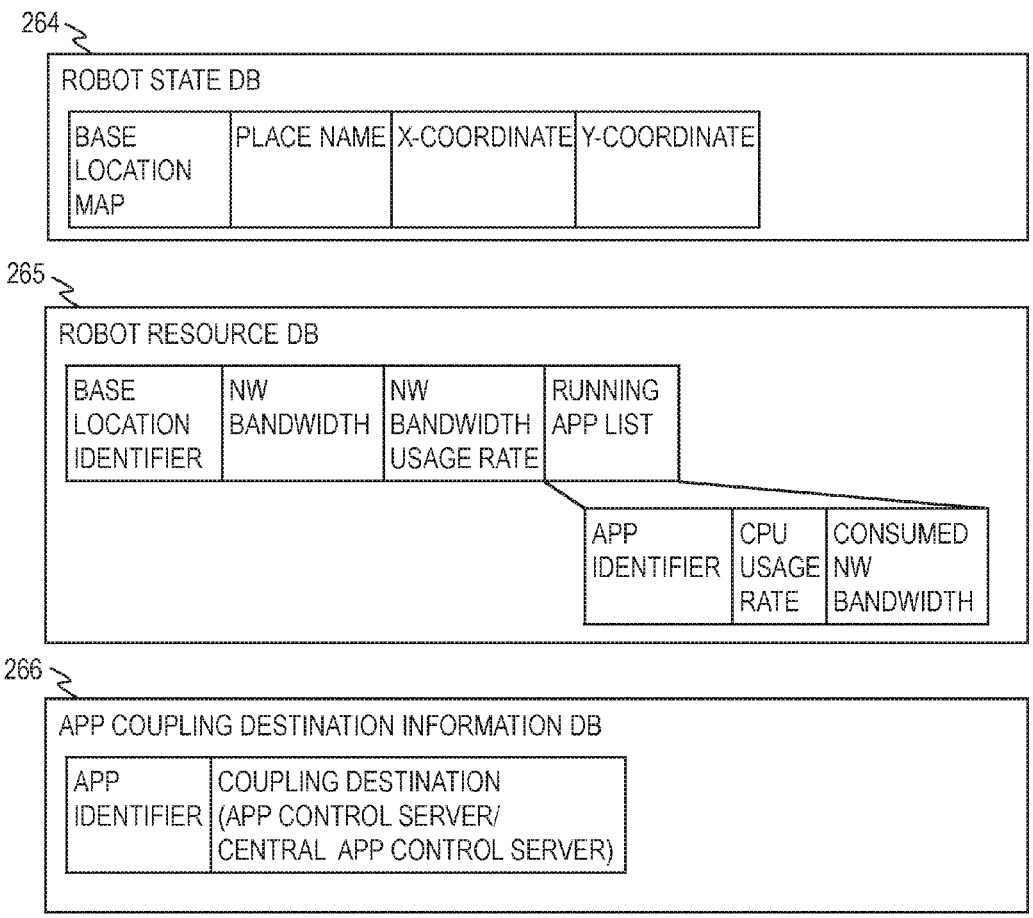
FIG. 3 is a block diagram illustrating the structure of data managed by the robot.

FIG. 3 is an illustration of structures of various databases existing in the internal storage apparatus 26 of the robot 21. The robot state DB 264 is a database for managing the information relating to the state of the robot 21 itself, and includes a base location map, a place name, an X-coordinate, and a Y-coordinate of the monitoring target base location 1 in which the robot 21 is placed.

The base location map is information relating to a physical structure of the base location, for example, a shape, an area, and the like of a placement base location, and has the information initialized when the robot 21 is placed. The robot 21 has a self-position estimation function, and is configured to measure distances between surrounding walls and itself through use of a laser rangefinder or the like, to thereby be able to determine its own position (X-coordinate, Y-coordinate) within the monitoring target base location 1.

The base location map includes not only the physical structure of the base location but also information relating to a place. For example, it is possible to define information relating to a room within the base location through use of the coordinates.

The robot resource DB 265 is a database for managing use statuses of computer resources of the robot control terminal 2, and includes a base location identifier of the monitoring target base location 1 in which the robot 21 is placed, a network (NW) bandwidth and a network bandwidth usage rate of the relevant base location, and a running APP list being a list of applications running on a robot control terminal. One item of the running APP list includes: an APP identifier for uniquely identifying the application within the system; and a CPU usage rate and a consumed NW bandwidth of the relevant application.

The APP coupling destination information DB 266 is a database for managing the coupling destination of an application operating on an external server among the applications used by the robot 21, and includes the APP identifier and the coupling destination. For example, when speech recognition processing is operating on the APP control server 3 within the base location, the coupling destination of the speech recognition processing is the APP control server 3.

Figure 4:
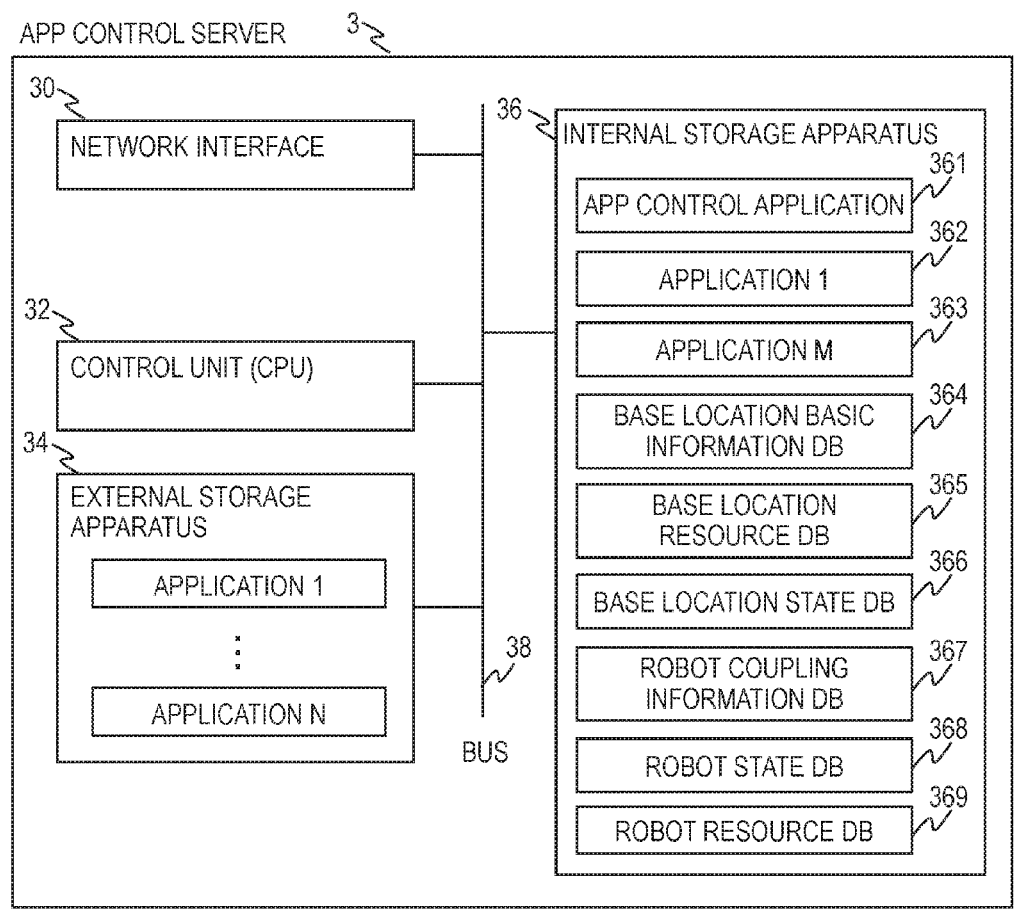
FIG. 4 is a block diagram illustrating the structure of an APP control server.

FIG. 4 is an illustration of an apparatus structure of the APP control server 3. The APP control server 3 includes a control unit (CPU) 32, a memory or other such internal storage apparatus 36, a hard disk drive or other such external storage apparatus 34, and a network interface 30, which are coupled to one another through a bus 38, and are configured to communicate to/from one another through the network interface 30, the in-house LAN 4, and the inter-base-location network 5.

The internal storage apparatus 36 includes an APP control application 361 configured to conduct processing for executing, activating, and stopping an application. The internal storage apparatus 36 further includes various applications (362 and 363) for providing various functions to the robot 21.

Among the various applications, a plurality of applications can be activated depending on the functions required by the robot 21. The application is installed by the external storage apparatus 34, and is activated by the control unit (CPU) 32 as the need arises.

In addition to those applications, the APP control server 3 includes a base location basic information DB 364 for managing basic information on the base location, a base location resource DB 365 for managing use the statuses of computer resources in the base location, a base location state DB 366 for managing various states in the base location, a robot coupling information DB 367 for managing APP coupling statuses of all the robots 21 within the base location, a robot state DB 368 for managing states of all the robots 21 within the base location, and a robot resource DB 369 for managing resource use statuses of all the robots 21 within the base location.

Those respective databases may be stored in the external storage apparatus 34 depending on the scale of the system, the processing performance of the APP control server 3, and the like. Those databases are loaded into the internal storage apparatus 36, and read and written by the APP control application 361 being executed.

The control unit (CPU) 32 is configured to access the APP control application 361 stored in the internal storage apparatus 36, to thereby cause the APP control server 3 to execute application control processing.

FIG. 5 is an illustration of structures of various databases existing in the internal storage apparatus 36 of the APP control server 3. The base location basic information DB 364 is a database for managing basic information on the monitoring target base location 1, and includes the base location identifier for uniquely identifying the monitoring target base location 1 within the system and a fixed APP list.

The fixed APP list is a list of the identifiers of applications that need to be always executed on the APP control server 3 placed in the relevant monitoring target base location 1, i.e., that cannot be executed on the robot 21 or the central APP control server 7, among the applications.

For example, a speech recognition application with noise tolerability is subject to the influence of the physical structure of the base location, and hence it is desired that the speech recognition application have an execution environment within the base location. A base location basic information DB holds such a list of the applications.

The base location resource DB 365 is a database for managing the use statuses of the computer resources of the APP control server 3, and includes the base location identifier of the monitoring target base location 1 in which the APP control server 3 is placed, the network (NW) bandwidth and the network bandwidth usage rate of the relevant base location, and the running APP list being a list of applications running on the APP control server 3. One item of the running APP list includes: the APP identifier for uniquely identifying the application within the system; and the CPU usage rate and the consumed NW bandwidth of the relevant application.

The base location state DB 366 is a database for managing various states of the base location, and includes the base location identifier, the base location map, and a base location task schedule. The base location identifier and the base location map are shared with all the robots 21 within the monitoring target base location. The base location task schedule is used for managing information relating to a schedule of a task to be executed in the monitoring target base location, and includes a place name, a start time and an end time of the task, and task details.

For example, in a case where the monitoring target base location 1 is a bank, making a deposit, financing consultation, and other such normal banking tasks are performed on a floor for serving a customer during business hours of the bank, while monitoring and detection of suspicious persons are main tasks on the floor for serving a customer outside the business hours of the bank. Thus, the provided tasks vary depending on the time slot.

The robot coupling information DB 367 is a database for managing an application use status of the robot 21 within the monitoring target base location 1, and includes a robot identifier for uniquely identifying the robot 21 within the system, the APP identifier for identifying the application being used by the robot 21, the network bandwidth consumed by the application, and the CPU usage rate.

The robot state DB 368 is a database for managing the states of all the robots 21 placed in the same base location, and has the same basic structure as that of the robot state DB 264 of the robot 21.

In order to manage the states of a plurality of robots 21, the robot state DB 368 includes the robot identifier in addition to the robot state DB 264 of the robot 21.

The robot resource DB 369 is a database for managing the use statuses of the computer resources of all the robots 21 placed in the same base location, and has the same basic structure as that of the robot resource DB 265 of the robot 21. In order to manage the states of a plurality of robots 21, the robot resource DB 369 includes the robot identifier in addition to the robot resource DB 265 of the robot 21.

Figure 6:
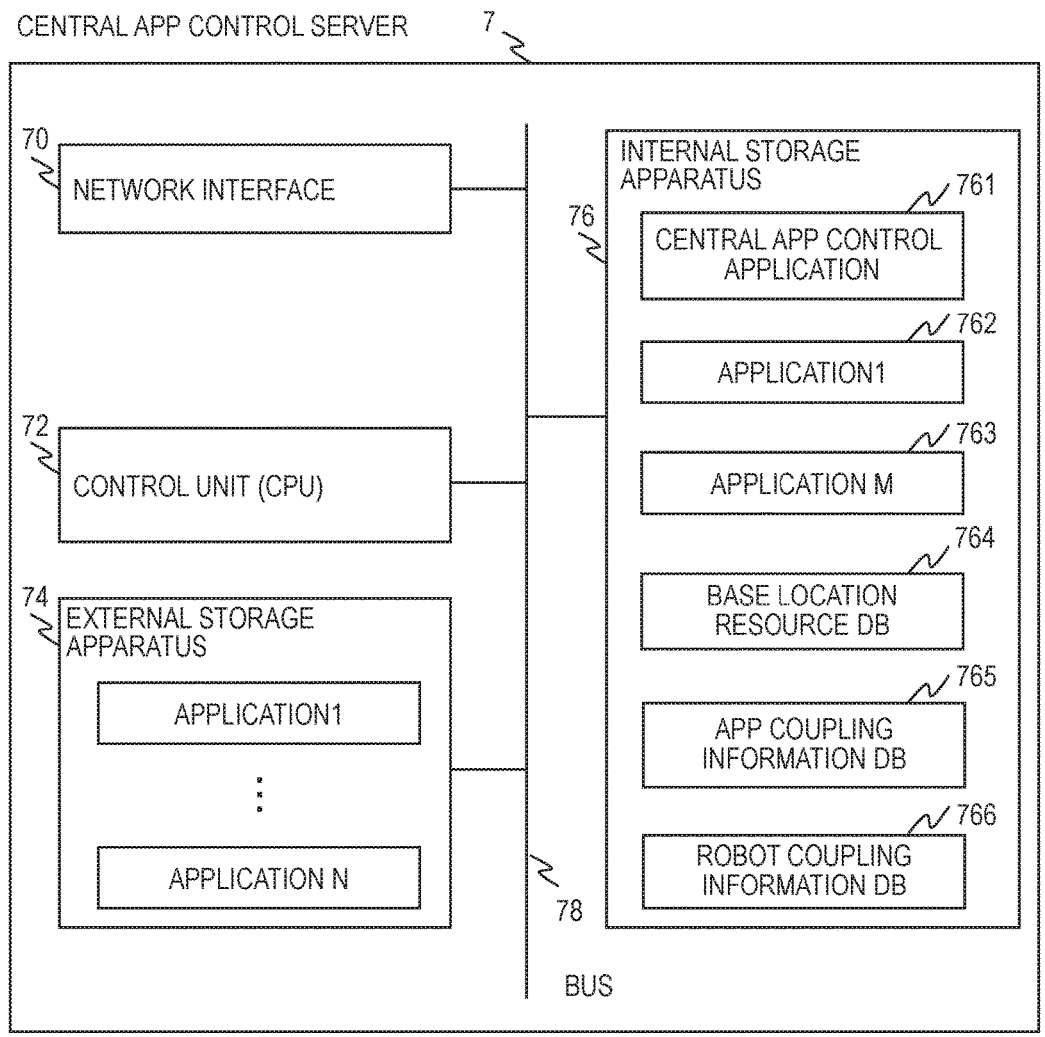
FIG. 6 is a block diagram illustrating a structure of a central APP control server.

FIG. 6 is an illustration of an apparatus structure of the central APP control server 7. The central APP control server 7 includes a control unit (CPU) 72, a memory or other such internal storage apparatus 76, a hard disk drive or other such external storage apparatus 74, and a network interface 70, which are coupled to one another through a bus 78, and are configured to communicate to/from one another through the network interface 70, the in-base-location LAN 9, and the inter-base-location network 5.

The internal storage apparatus 76 includes a central APP control application 761 configured to conduct processing for executing, activating, and stopping an application. The internal storage apparatus 76 further includes various applications (762 and 763) for providing various functions to the robot 21. Among the various applications, a plurality of applications can be activated depending on the functions required by the robot 21.

The application is installed in the external storage apparatus 74, and is activated when the operation of the system is started by the control unit (CPU) 72. In addition to those applications, the central APP control server 7 includes a base location resource DB 764 for managing the use statuses of the computer resources of the monitoring center, an APP coupling information DB 765 for managing the use status of the application in the base location, and a robot coupling information DB 766 for managing the APP coupling statuses of all the robots 21 coupled to the central APP control server 7.

Those respective databases may be stored in the external storage apparatus 74 depending on the scale of the system, the processing performance of the central APP control server 7, and the like. Those databases are read and written by the central APP control application 761 installed in the internal storage apparatus 76.

The control unit (CPU) 72 is configured to access the central APP control application 761 stored in the internal storage apparatus 76, to thereby cause the central APP control server 7 to execute central application control processing.

FIG. 7 is an illustration of structures of various databases existing in the internal storage apparatus 76 of the central APP control server 7. The base location resource DB 764 is a database for managing the use statuses of the computer resources of the monitoring center 6, and has the same structure as that of the base location resource DB 365 of the APP control server 3.

The APP coupling information DB 765 is a database for managing the application use statuses in all the monitoring target base locations 1, and includes the base location identifier for uniquely identifying the monitoring target base location 1 within the system, the APP identifier for identifying the application being used in the monitoring target base location 1, the network bandwidth consumed by the application, and the CPU usage rate.

The robot coupling information DB 766 is a database for managing the application use status of the robot 21 in the monitoring target base location in which the APP control server 3 does not exist as illustrated in a monitoring target base location 2 (1-2) of FIG. 1, and includes the base location identifier for uniquely identifying the monitoring target base location 1 within the system, the robot identifier, the APP identifier for identifying the application being used by the robot 21, the network bandwidth consumed by the application, and the CPU usage rate.

Figure 8:
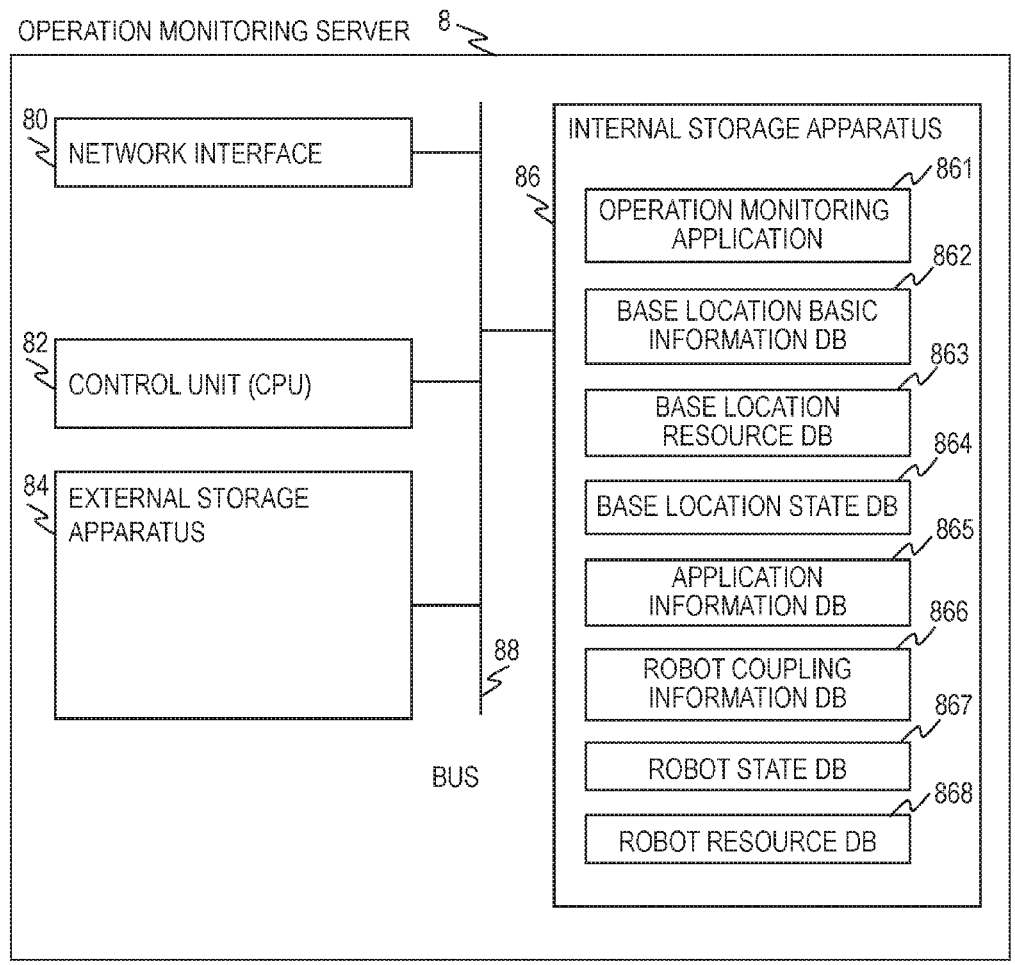
FIG. 8 is a block diagram illustrating the structure of an operation monitoring server.

FIG. 8 is an illustration of an apparatus structure of the operation monitoring server 8. The operation monitoring server 8 includes a control unit (CPU) 82, a memory or other such internal storage apparatus 86, a hard disk drive or other such external storage apparatus 84, and a network interface 80, which are coupled to one another through a bus 88, and are configured to communicate to/from one another through the network interface 80, the in-base-location LAN 9, and the inter-base-location network 5.

The internal storage apparatus 86 includes an operation monitoring application 861 configured to integrally conduct the operation monitoring of all the robots 21 and the APP control servers 3 within the system.

The internal storage apparatus 86 further includes a base location basic information DB 862 for managing basic information on the monitoring target base locations (1-1 to 1-N), a base location resource DB 863 for managing the use statuses of the computer resources in the monitoring target base locations (1-1 to 1-N), a base location state DB 864 for managing various states of the monitoring target base locations (1-1 to 1-N), an application information DB 865 for managing the condition for controlling a place in which the application is caused to run based on the use status of the application, a robot coupling information DB 866 for managing the application use statuses of the robots (21-1 to 21-N) within the system, a robot state DB 867 for managing the states of the robots (21-1 to 21-N) within the system, and a robot resource DB 868 for managing the resource use statuses of the robots (21-1 to 21-N) within the system.

Those respective databases may be stored in the external storage apparatus 84 depending on the scale of the system, the processing performance of the operation monitoring server 8, and the like. Those databases are read and written by the operation monitoring application 861 installed in the internal storage apparatus 86.

The control unit (CPU) 82 is configured to access the operation monitoring application 861 stored in the internal storage apparatus 86, to thereby cause the operation monitoring server 8 to execute integral management of the system.

Of the databases included in the internal storage apparatus 86 of the operation monitoring server 8, the databases other than the application information DB 865 are the databases for centrally managing the information on the robot 21 or the monitoring target base location 1, and the databases having the same data structures and the same names exist on another server.

Correspondence relationships among the respective databases are as follows:
- the base location basic information DB 862 corresponds to the base location basic information DB 364 of the APP control server 3;
- the base location resource DB 863 corresponds to the base location resource DB 365 of the APP control server 3;
- the base location state DB 864 corresponds to the base location state DB 366 of the APP control server 3;
- the robot coupling information DB 866 corresponds to the robot coupling information DB 367 of the APP control server 3;
- the robot state DB 867 corresponds to the robot state DB 368 of the APP control server 3; and
- the robot resource DB corresponds to the robot resource DB 369 of the APP control server 3.

Figure 9:
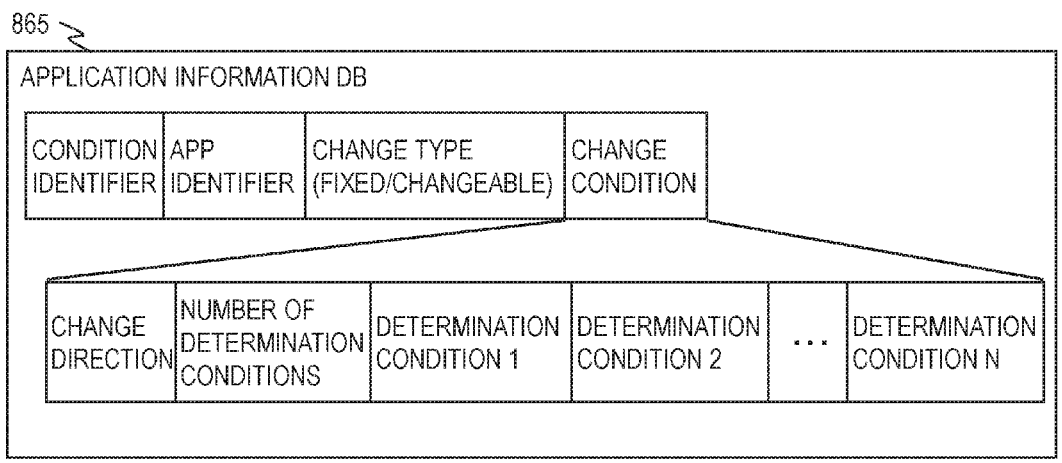
FIG. 9 is a block diagram illustrating the structure of data managed by the operation monitoring server.

Descriptions relating to the structures of those databases are omitted, and the application information DB 865 is described below with reference to FIG. 9.

The application information DB 865 is a database for managing the execution environment of the application.

A change of an APP control server conducted in this embodiment represents processing for changing an executed place of an application from a given apparatus (robot or server) to another apparatus (robot or server). Specifically, an application program may be migrated, or instead, each of a plurality of servers may store an application program for providing the same functions and an apparatus on which the application program is executed may be switched without the migration of the application program.

There exist six patterns of the change as follows:
(1) a change from the robot 21 to the APP control server 3;
(2) a change from the APP control server 3 to the robot 21;
(3) a change from the APP control server 3 to the central APP control server 7;
(4) a change from the central APP control server 7 to the APP control server 3;
(5) a change from the robot 21 to the central APP control server 7; and
(6) a change from the central APP control server 7 to the robot 21.

A database for managing a change rule for a control server functioning as the above-mentioned service request processing apparatus is the application information DB 865. The application information DB 865 includes a condition identifier for uniquely identifying a change condition, the identifier of the application being a change target for the apparatus on which the application program is executed, a change type, and the change condition.

The change type takes a value selected from two values of "fixed" and "changeable". When the change type is "fixed", the change of the control server functioning as the service request processing apparatus cannot be applied. When the change type is "changeable", it is determined whether or not to change the control server based on the change condition. The change condition includes a change direction, the number of determination conditions, and a specific determination condition. A plurality of determination conditions can be specified for one condition identifier. The change determination is described later in detail. The change direction corresponds to any one of the above-mentioned six patterns.

Next, an overall operation of the device operation monitoring system according to this embodiment is described.

Figure 10:
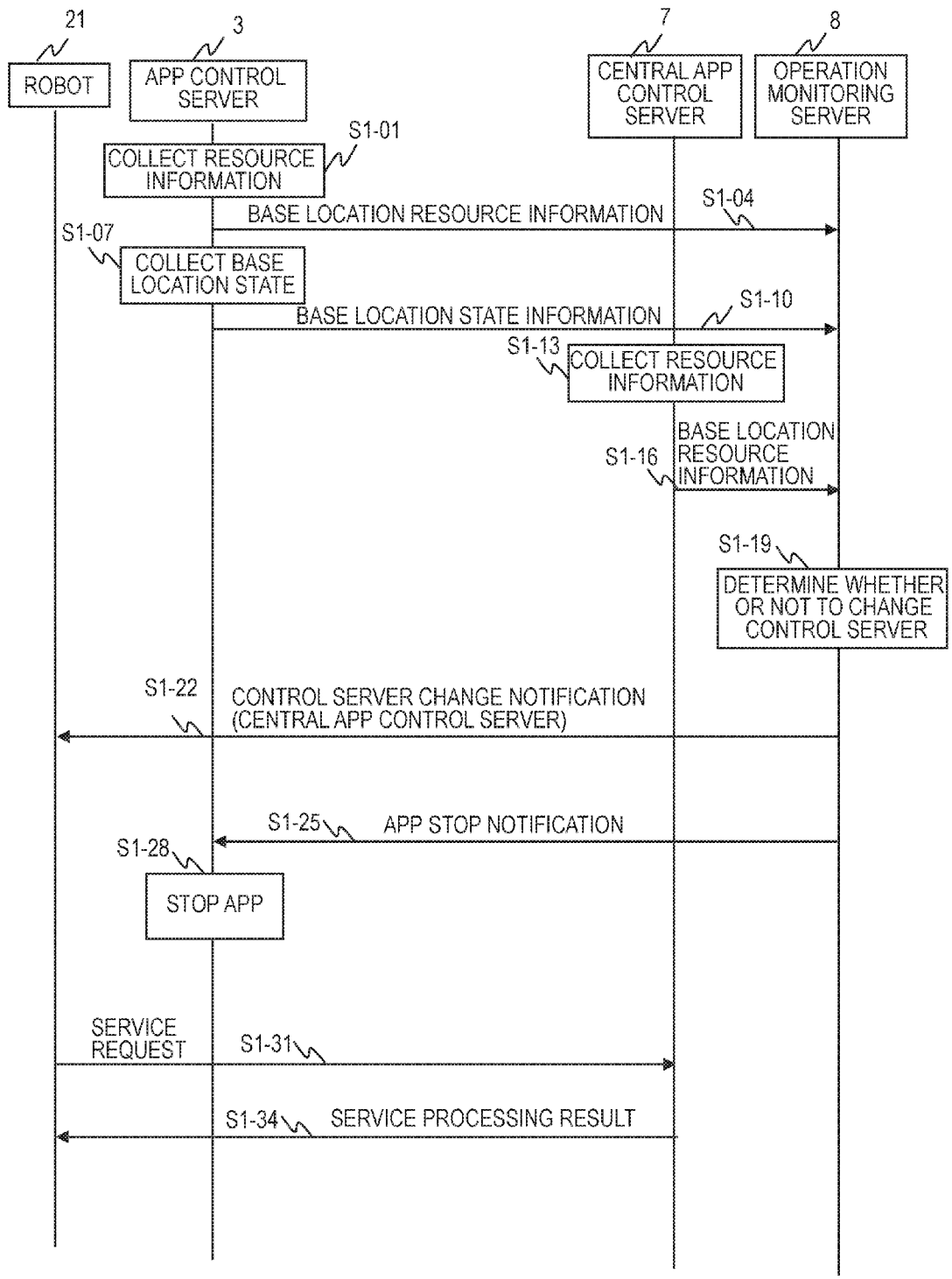
FIG. 10 is a time sequence diagram for explaining an example of application control processing of the embodiment.

First, a flow of control of changing the service request processing apparatus from the APP control server 3 to the central APP control server 7 is described with reference to a time sequence diagram of FIG. 10.

When the amount of computer resources of the robot 21 is limited, most applications operate outside the robot 21. From the viewpoint of the robot 21, the outside is the APP control server 3 or the central APP control server 7, and hence the control server functioning as the service request processing apparatus is often changed between those servers.

The change processing for the control server functioning as the service request processing apparatus is controlled by the operation monitoring server 8, and hence the APP control server 3 and the central APP control server 7 are configured to transmit the information necessary for the control to the operation monitoring server 8.

For example, the APP control server 3 placed in at least one monitoring target base location collects information relating to the resource of its own base location (Step S1-01), updates the base location resource DB 365, and transmits the collected information to the operation monitoring server 8 as base location resource information (Step S1-04). The transmitted contents of the base location resource information match the contents of corresponding items of the base location resource DB 365.

After transmitting the base location resource information, each APP control server 3 collects the information relating to a base location state of the own base location (Step S1-07), updates the base location state DB 366, and transmits the collected information to the operation monitoring server 8 as base location state information (Step S1-10).

The execution order of from Step S1-01 to Step S1-10 conducted by each APP control server 3 may be other than the above-mentioned order.

The central APP control server 7 also collects resource information in the same manner (Step S1-13), updates the base location resource DB 764, and transmits the base location resource information to the operation monitoring server 8 (Step S1-16).

The execution order of information transmission conducted by each APP control server 3 and information transmission conducted by the central APP control server 7 may be other than the above-mentioned order.

The operation monitoring server 8 determines whether or not there is an application that necessitates the change of the service request processing apparatus based on the base location resource information and the base location state information collected from the APP control server 3 and the central APP control server 7 (Step S1-19). An algorithm for determining whether or not to change the service request processing apparatus is described later.

In this case, when there is an application that necessitates the change of the service request processing apparatus from the APP control server 3 to the central APP control server 7, the operation monitoring server 8 identifies an APP control server 3 on which the relevant application is running, and transmits a server change notification message (hereinafter referred to as "server change notification") to the robot 21 placed in the same monitoring target base location 1 in which the relevant APP control server 3 is placed, to thereby cause the robot 21 to register the service request processing apparatus obtained after the change (Step S1-22).

The server change notification includes an application identifier and coupling destination information on the application. The central APP control server 7 is specified as the coupling destination of the application.

In order to prevent the resources of the APP control server 3 from being wasted after the change of the service request processing apparatus, the operation monitoring server 8 transmits an APP stop notification to the APP control server 3 (Step S1-25). The APP control server 3, which has received the APP stop notification, conducts processing for stopping the target application (Step S1-28).

The robot 21, which has received the change notification for the service request processing apparatus, transmits a service request message to the central APP control server 7 to use the specified application (Step S1-31). The central APP control server 7 executes the above-mentioned application, processes the above-mentioned service request, and returns the service processing result to the robot 21 (Step S1-34).

Figure 11:
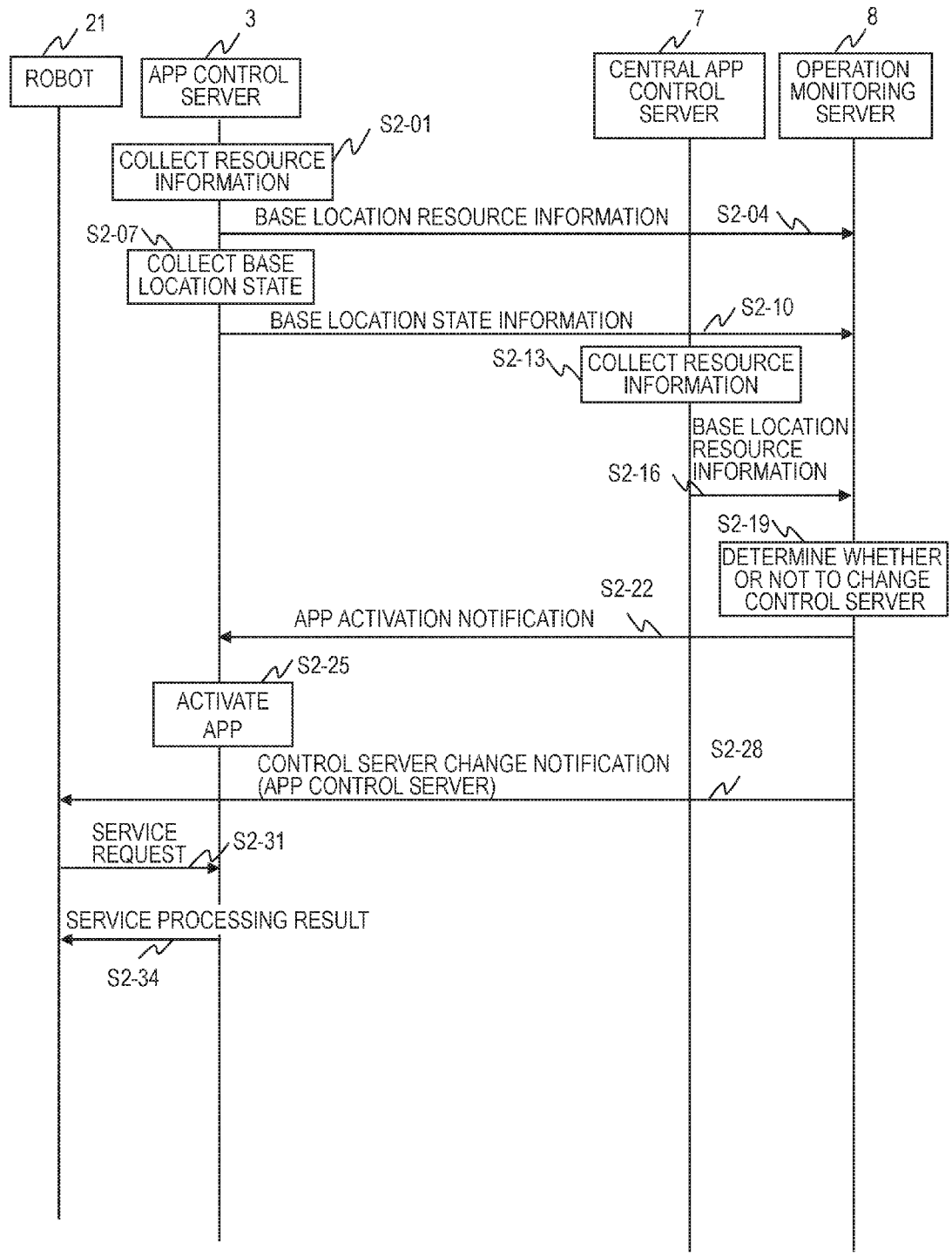
FIG. 11 is a time sequence diagram for explaining an example of application control processing according to the embodiment.

Next, a flow of control of changing the apparatus on which the application program is executed from the central APP control server 7 to the APP control server 3 is described with reference to a time sequence diagram of FIG. 11.

The change processing for the service request processing apparatus is controlled by the operation monitoring server 8, and hence the APP control server 3 and the central APP control server 7 are configured to transmit the information necessary for the control to the operation monitoring server 8. In regard to the processing for the information collection and transmission, the processing of from Step S2-01 to Step S2-16 of FIG. 11 is the same as the processing of from Step S1-01 to Step S1-16 of FIG. 10, and hence a description thereof is omitted.

In Step S2-19, the operation monitoring server 8 determines whether or not there is an application that necessitates the change of the apparatus on which the application program is executed. In this case, when there is an application that necessitates the change of the apparatus with the change direction being from the central APP control server 7 to the APP control server 3, the operation monitoring server 8 transmits an APP activation notification to the APP control server 3 being a change destination in order to prepare for the change of the service request processing apparatus (Step S2-22).

The APP control server 3, which has received the APP activation notification, activates the specified application (Step S2-25). After transmitting the APP activation notification, the operation monitoring server 8 transmits the server change notification to the robot 21 relating to the APP control server 3 being the change target for the service request processing apparatus (Step S2-28).

In the server change notification, the APP identifier of the application to be subjected to the change of the apparatus on which the application program is executed is specified, and the APP control server 3 is specified as the coupling destination. After the server change notification is received, the application processing is conducted between the robot 21 and the APP control server 3 (Step S2-31 and Step S2-34).

Some applications are executed on the robot 21, and hence the service request processing apparatus may be changed between the robot 21 and the APP control server 3 or the central APP control server 7.

Figure 12:
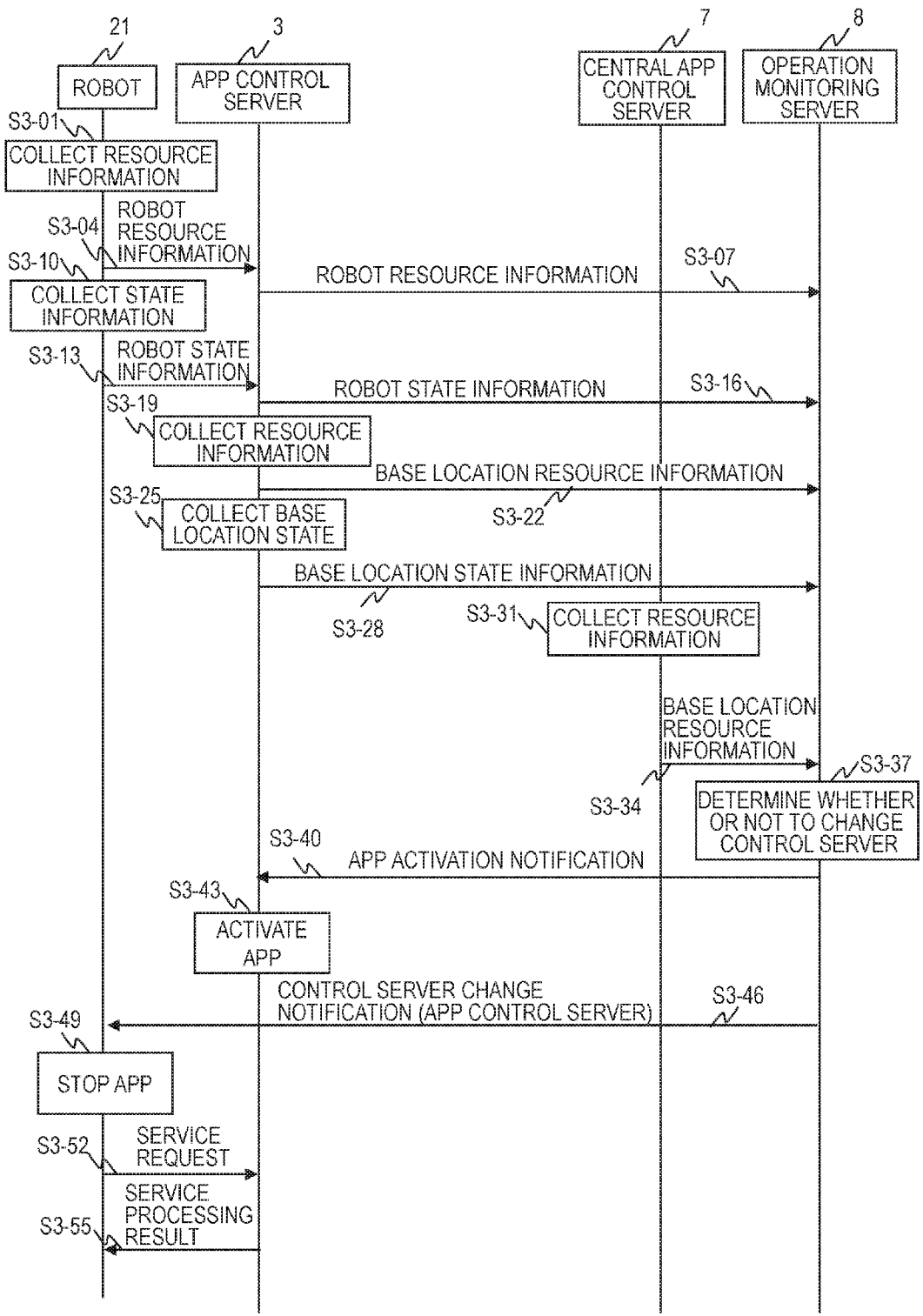
FIG. 12 is a time sequence diagram illustrating an example of an application control process according to the embodiment.

FIG. 12 is a time sequence diagram for illustrating processing for a case of changing the apparatus on which the application is executed from the robot 21 to the APP control server 3. In this case, the operation monitoring server 8 needs to grasp the resource use status and the state of the robot 21.

Therefore, the robot 21 collects resource information and state information (Step S3-01 and Step S3-10), and transmits those pieces of information to the APP control server 3 (Step S3-04 and Step S3-13). The contents of robot resource information match the contents of the robot resource DB 369. The contents of robot state information also match the contents of the robot state DB 368.

The APP control server 3, which has received the robot resource information and the robot state information from the robot 21, transmits those pieces of information to the operation monitoring server 8 (Step S3-07 and Step S3-16). The APP control server 3 and the central APP control server 7 transmit the base location resource information and the base location state information to the operation monitoring server 8 by the same method as in the processing of from Step S1-01 to Step S1-16 of FIG. 10 (Step S3-19 to Step S3-34).

The operation monitoring server 8 determines whether or not to change the service request processing apparatus based on the robot resource information, the robot state information, the base location resource information, and the base location state information, which have been collected from the respective apparatus (Step S3-37). In this case, the apparatus on which the application program is executed is changed from the robot 21 to the APP control server 3, and hence the operation monitoring server 8 transmits, to the APP control server 3, an activation notification for the application to be newly executed (Step S3-40).

The APP activation notification specifies the application identifier of the application to be activated. The APP control server 3 activates the specified application (Step S3-43).

After that, the operation monitoring server 8 transmits the server change notification to the robot 21 (Step S3-46), and notifies the robot 21 that the target application is being executed on the APP control server 3.

The robot 21 updates the APP coupling destination information DB 266 so that the coupling destination of the target application becomes the APP control server 3, and stops the relevant application running on the robot 21 (Step S3-49).

After that, the processing of the relevant application is conducted between the robot 21 and the APP control server 3 through transmission and reception of messages (Step S3-52 and Step S3-55).

In regard to the change of the service request processing apparatus including the robot 21, the following three cases are conceivable in addition to the case of FIG. 12:
(1) a change of the service request processing apparatus from the APP control server 3 to the robot 21;
(2) a change of the service request processing apparatus from the robot 21 to the central APP control server 7; and
(3) a change of the service request processing apparatus from the central APP control server 7 to the robot 21.

Figure 13:
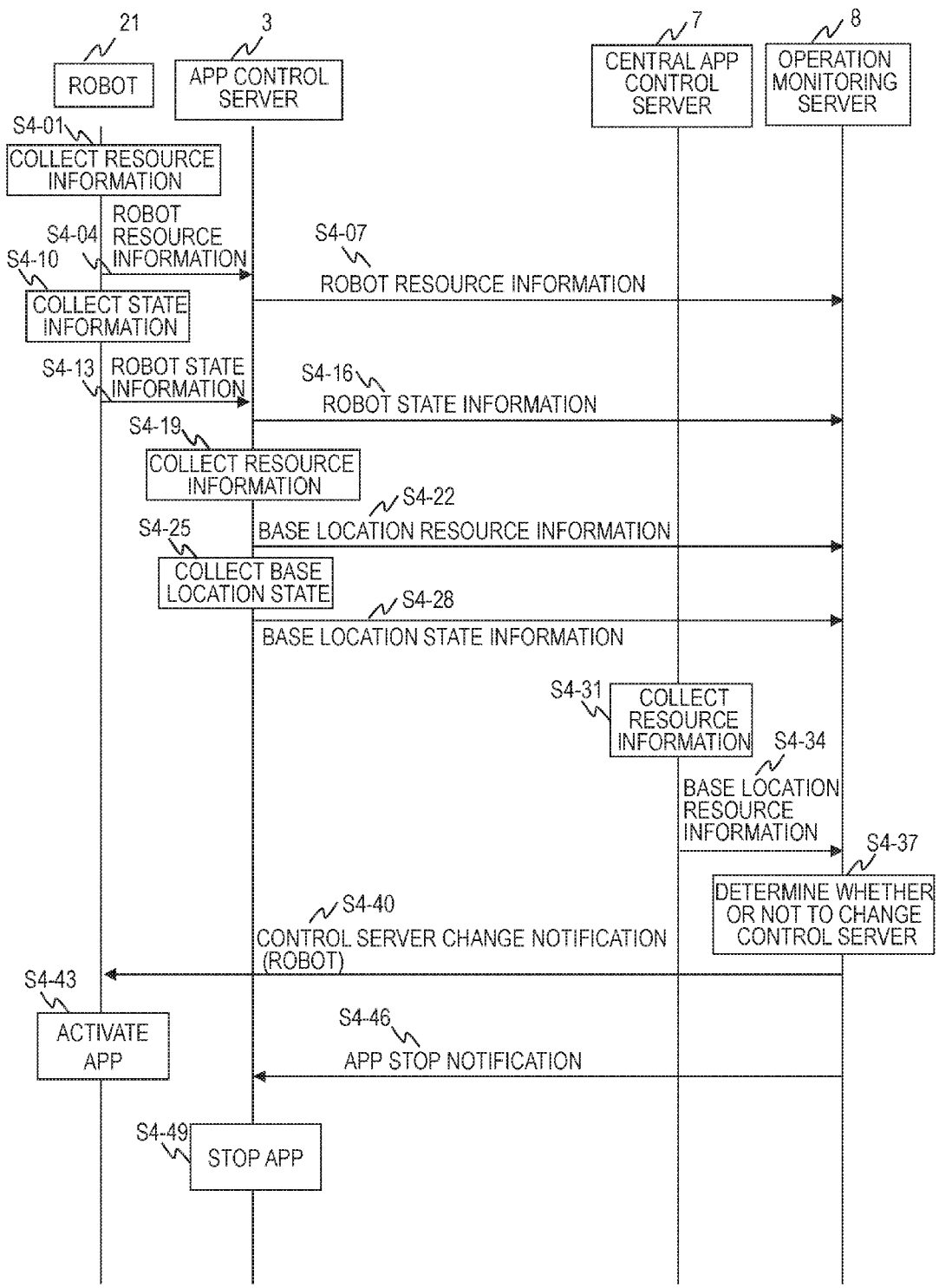
FIG. 13 is a time sequence diagram illustrating an example of the application control process of the embodiment.

FIG. 13 is a time sequence diagram of a case of changing the service request processing apparatus from the APP control server 3 to the robot 21. The processing for collecting various kinds of information from the robot 21, the APP control server 3, and the central APP control server 7 (Step S4-01 to Step S4-34) is the same as the processing of from Step S3-01 to Step S3-34 of FIG. 12, and hence a description thereof is omitted.

In Step S4-37, the operation monitoring server 8 determines that the service request processing apparatus is to be changed from the APP control server 3 to the robot 21, and transmits the server change notification to the robot 21 (Step S4-40).

The robot 21, which has received the server change notification, comes to know that the robot 21 itself is the change target for the service request processing apparatus, and activates the application specified by the application identifier (Step S4-43).

The operation monitoring server 8 transmits the APP stop notification to the APP control server 3 (Step S4-46), and the APP control server 3 stops the specified application (Step S4-49).

Figure 14:
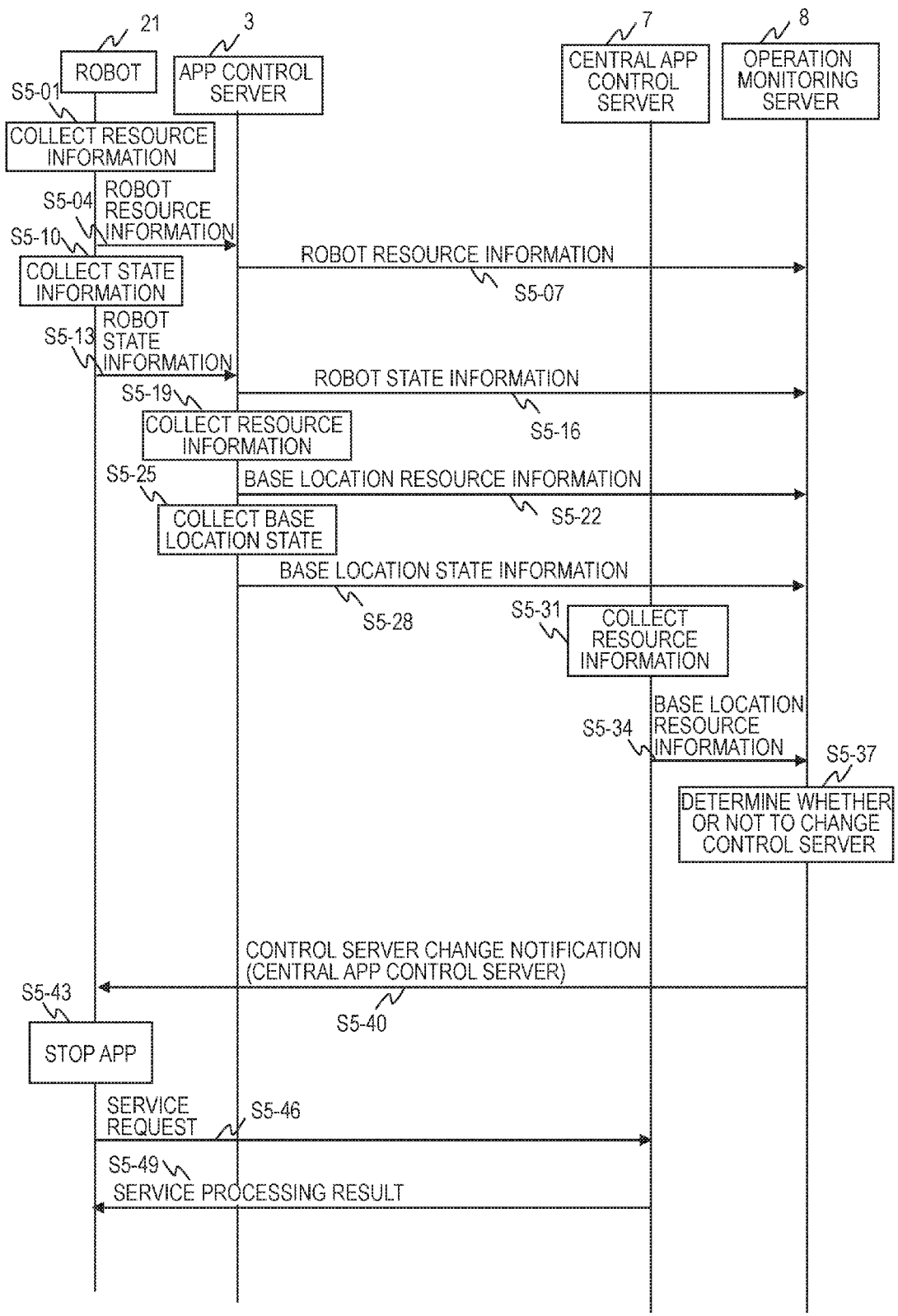
FIG. 14 is a time sequence diagram illustrating an example of an application control process according to the embodiment.

FIG. 14 is a time sequence diagram of a case of changing the service request processing apparatus from the robot 21 to the central APP control server 7.

It is essentially desired that the change destination for the service request processing apparatus employed in order to reduce a load on the robot 21 be the APP control server 3 placed in the same monitoring target base location 1 in which the robot 21 is placed, but when, for example, a processing load on the APP control server 3 is extremely heavy, the processing for the change to the central APP control server 7 is considered as an option.

The processing for collecting various kinds of information from the robot 21, the APP control server 3, and the central APP control server 7 (Step S5-01 to Step S5-34) is the same as the processing of from Step S3-01 to Step S3-34 of FIG. 12, and hence a description thereof is omitted.

In Step S5-37, the operation monitoring server 8 determines that the service request processing apparatus is to be changed from the robot 21 to the central APP control server 7, and transmits the server change notification to the robot 21 (Step S5-40).

The robot 21, which has received the server change notification, updates the APP coupling destination information DB 266 so that the specified coupling destination of the application becomes the central APP control server 7, and stops the specified application (Step S5-43).

After that, the processing of the relevant application is conducted between the robot 21 and the central APP control server 7 through transmission and reception of messages (Step S5-46 and Step S5-49).

Figure 15:
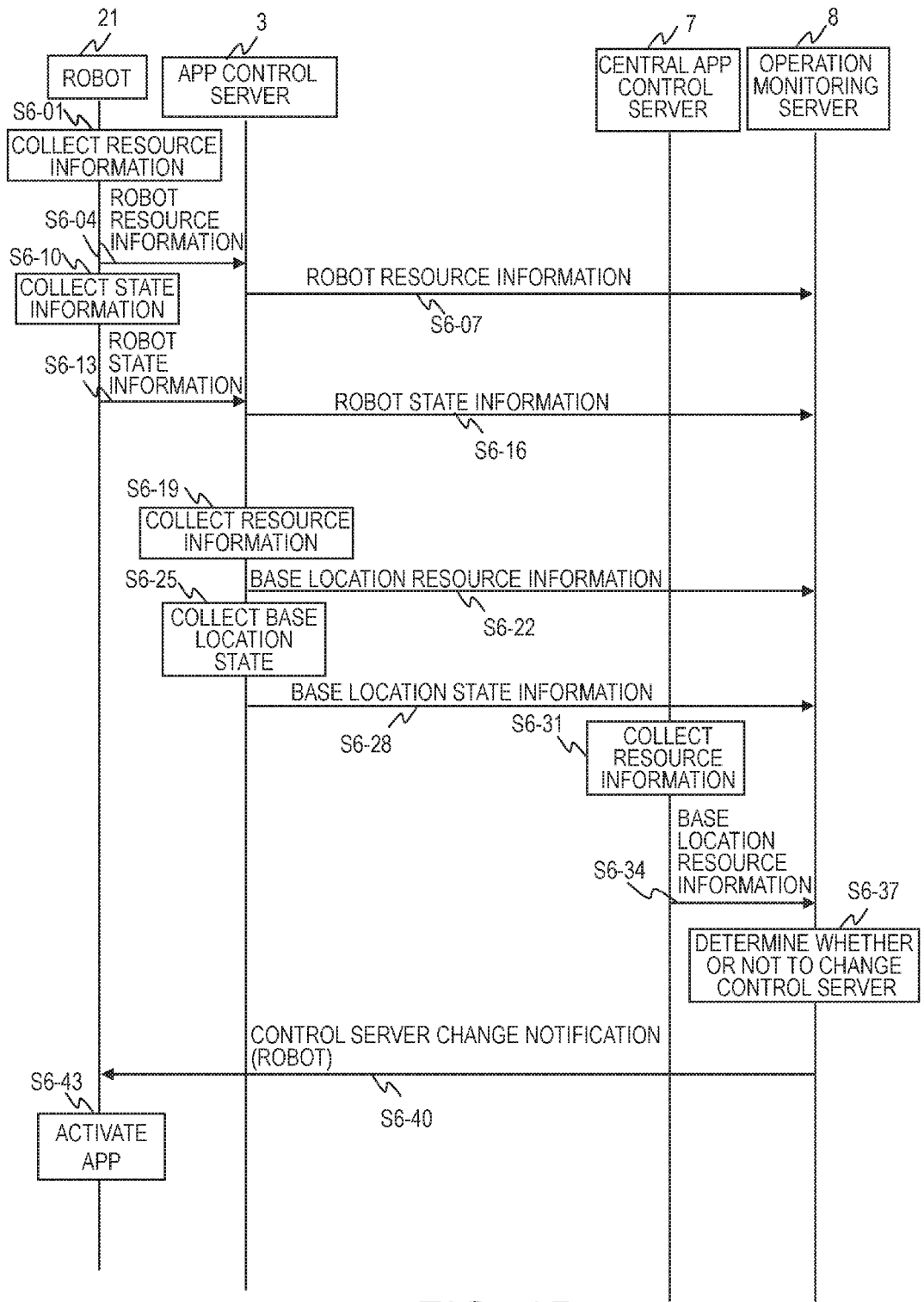
FIG. 15 is a time sequence diagram illustrating an example of an application control process according to the embodiment.

FIG. 15 is a time sequence diagram of a case of changing the service request processing apparatus from the central APP control server 7 to the robot 21.

The case corresponds to a case where a processing load on the robot 21 is lowered from the state of FIG. 14 to return to the original state. The processing for collecting various kinds of information from the robot 21, the APP control server 3, and the central APP control server 7 (Step S6-01 to Step S6-34) is the same as the processing of from Step S3-01 to Step S3-34 of FIG. 12, and hence a description thereof is omitted.

In Step S6-37, the operation monitoring server 8 determines that the service request processing apparatus is to be changed from the central APP control server 7 to the robot 21, and transmits the server change notification to the robot 21 (Step S5-40).

The robot 21, which has received the server change notification, updates the APP coupling destination information DB 266 so that the coupling destination of the specified application becomes the robot 21 itself, and activates the specified application (Step S6-43). The processing of the relevant application is conducted by the robot 21.

Figure 16:
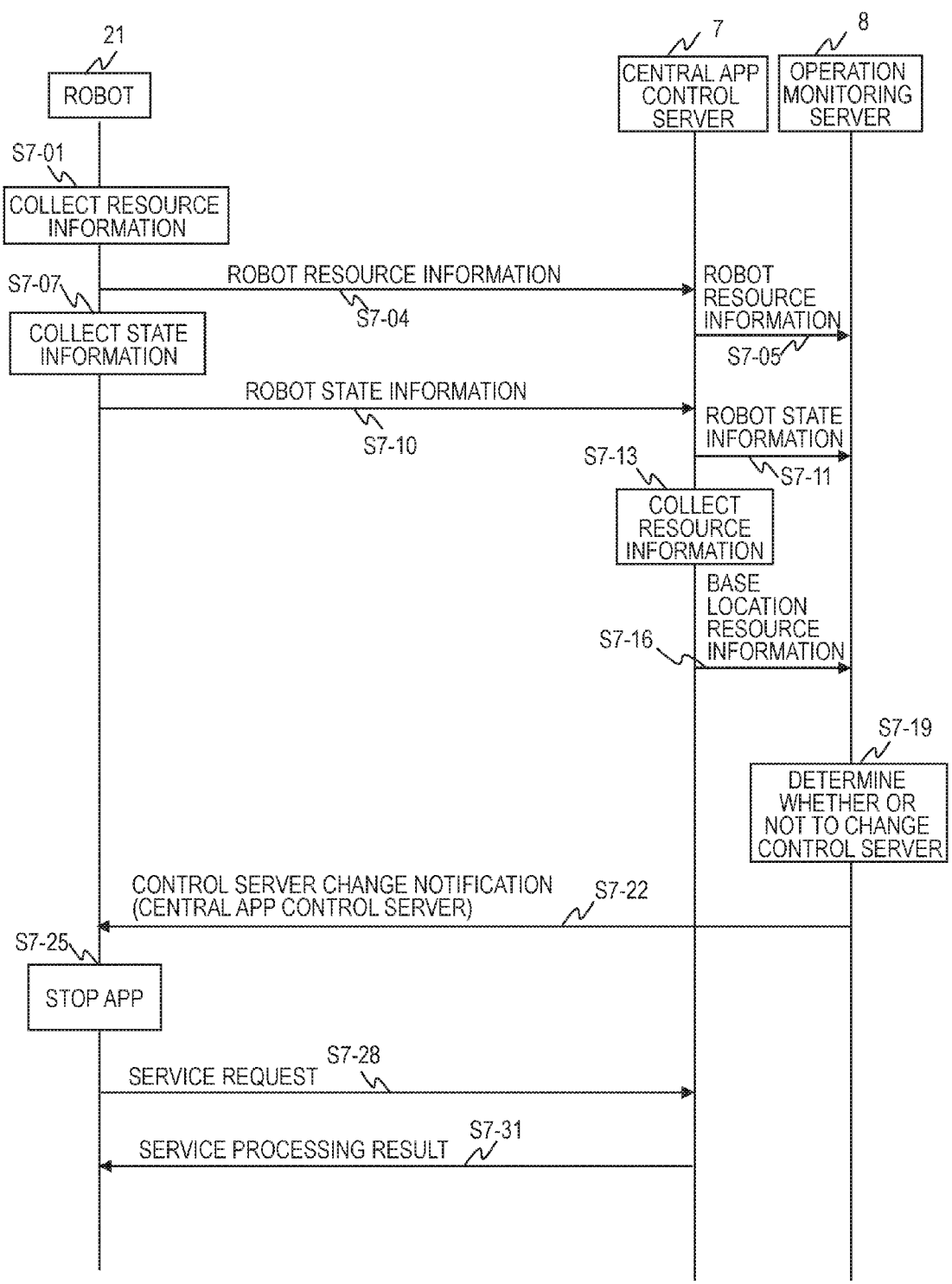
FIG. 16 is a time sequence diagram illustrating an example of the application control processing of the embodiment.

There is a case where the APP control server 3 does not exist as illustrated in the monitoring target base location 2 (1-2) of FIG. 1 depending on the base location. In this case, the robot 21 transmits various kinds of information to the operation monitoring server 8 through the central APP control server 7. FIG. 16 is a time sequence diagram of a case of changing the apparatus on which the application program is executed from the robot 21 to the central APP control server 7 in such a situation.

The robot 21 collects the resource information and the state information (Step S7-01 and Step S7-07), and transmits those pieces of information to the central APP control server 7 (Step S7-04 and Step S7-10). The contents of the robot resource information match the contents of the robot resource DB 369. The contents of robot state information also match the contents of the robot state DB 368.

The central APP control server 7, which has received the robot resource information and the robot state information from the robot 21, transmits those pieces of information to the operation monitoring server 8 (Step S7-05 and Step S7-11). The central APP control server 7 transmits the base location resource information to the operation monitoring server 8 by the same method as in the processing of Step S1-13 and Step S1-16 of FIG. 10 (Step S7-13 to Step S7-16).

The operation monitoring server 8 determines whether or not to change the service request processing apparatus based on the robot resource information, the robot state information, and the base location resource information, which have been collected from the respective apparatus (Step S7-19). In this case, in order to change the apparatus on which the application is caused to run from the robot 21 to the central APP control server 7, the operation monitoring server 8 transmits the server change notification to the robot 21 (Step S7-22), and notifies the robot 21 that the target application is being executed on the central APP control server 7.

The robot 21 updates the APP coupling destination information DB 266 so that the coupling destination of the target application becomes the central APP control server 7, and stops the relevant application running on the robot 21 (Step S7-25).

After that, the processing of the relevant application is conducted between the robot 21 and the central APP control server 7 through transmission and reception of messages (Step S7-28 and Step S7-31).

Figure 17:
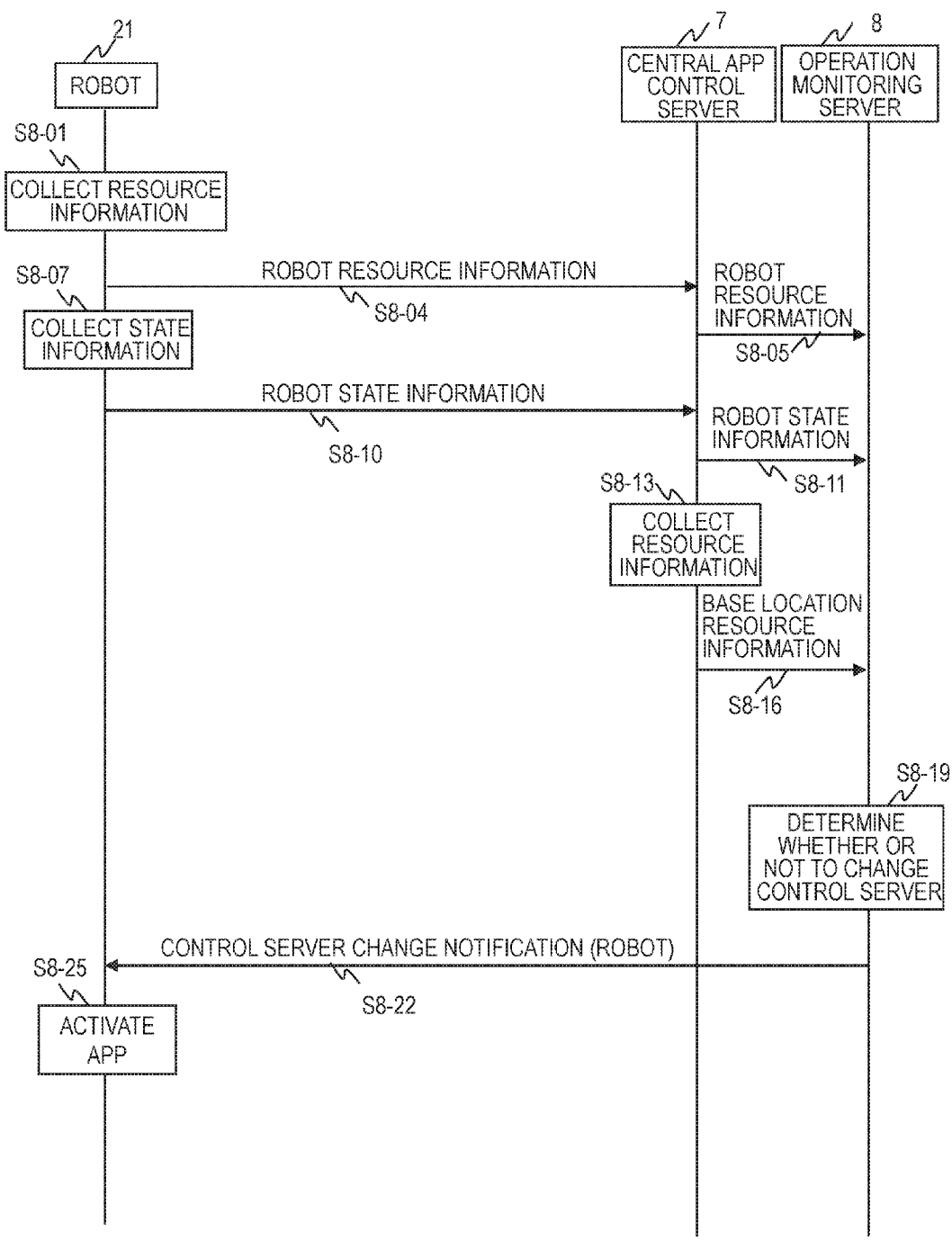
FIG. 17 is a time sequence diagram illustrating an example of the application control processing of the embodiment.

FIG. 17 is a time sequence diagram of a case of changing the apparatus on which the application is executed from the central APP control server 7 to the robot 21 in a manner reverse to the case of FIG. 16. The processing for collecting various kinds of information from the robot 21 and the central APP control server 7 (Step S8-01 to Step S8-16) is the same as the processing of from Step S7-01 to Step S7-16 of FIG. 16, and hence a description thereof is omitted.

In Step S8-19, the operation monitoring server 8 determines that the service request processing apparatus is to be changed from the central APP control server 7 to the robot 21, and transmits the server change notification to the robot 21 (Step S8-22). The robot 21, which has received the server change notification, updates the APP coupling destination information DB 266 so that the coupling destination of the specified application becomes the robot 21, and activates the specified application (Step S8-25).

When a plurality of robots 21 are placed in the monitoring target base location 1, the service request processing apparatus is changed for each robot 21.

Figure 18:
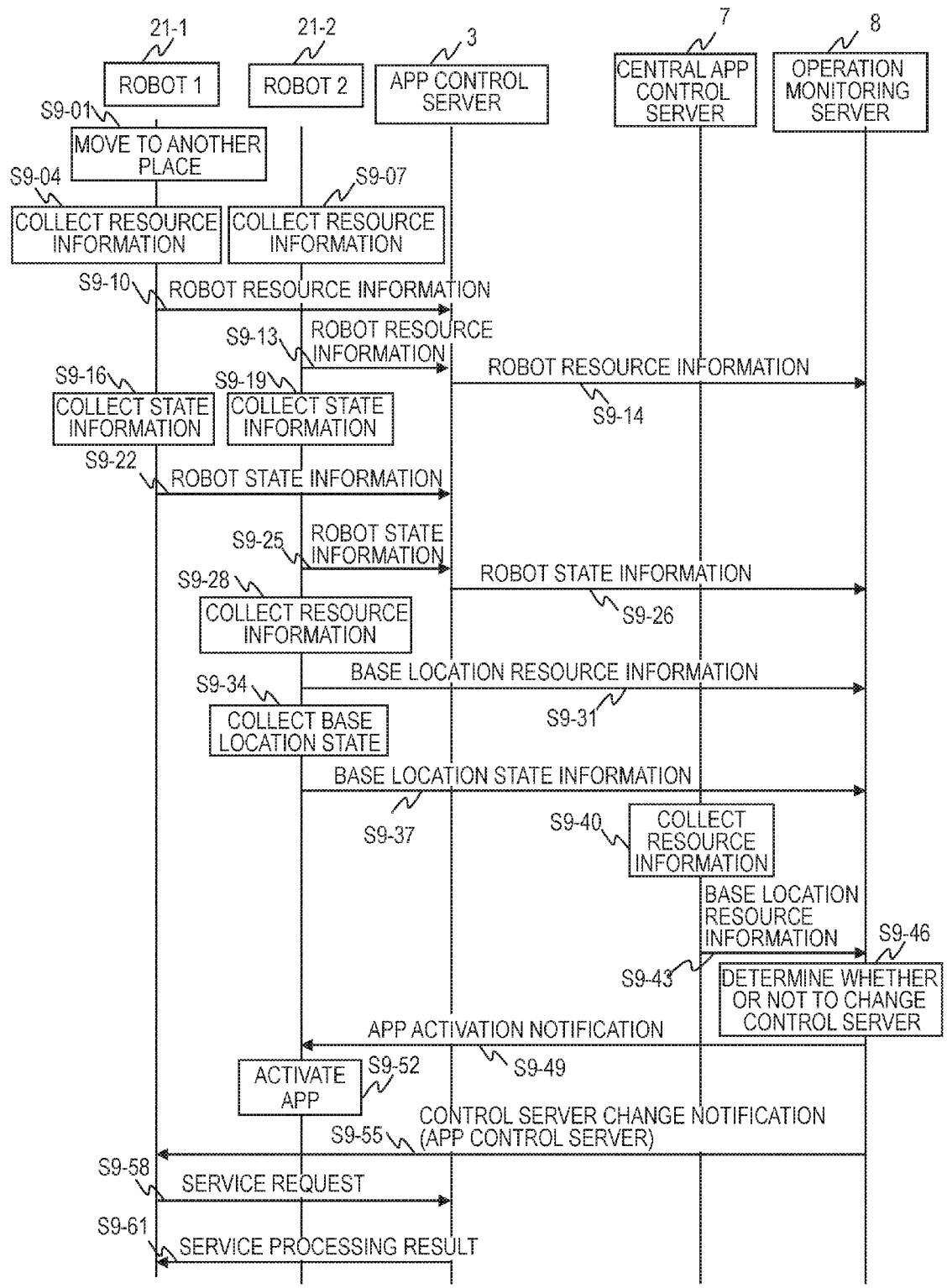
FIG. 18 is a time sequence diagram illustrating an example of the application control processing of the embodiment.

FIG. 18 is a time sequence diagram for illustrating determination processing for the change of the service request processing apparatus conducted when two robots of the robot 1 (21-1) and the robot 2 (21-2) are placed in the monitoring target base location 1. In this case, it is assumed that the robot 1 (21-1) and the robot 2 (21-2) were located in the same place at first and the robot 1 (21-1) has moved to another place (Step S9-01).

After the robot 21 has moved to another place, the role of the robot 21 within the system is changed. In the case of the bank, security monitoring is a main task of the robot 21 in a vault, while the robot 21 needs to conduct various tasks of serving a customer on the floor for serving a customer.

When a plurality of robots 21 exist in the base location, each robot 21 conducts the collection and notification of the robot resource information and the robot state information (Step S9-04 to Step S9-26).

When the APP control server 3 transmits the robot resource information and the robot state information to the operation monitoring server 8 (Step S9-14 and Step S9-26), the APP control server 3 collectively transmits the information on the robots (21-1 to 21-N) within the monitoring target base location.

The APP control server 3 and the central APP control server 7 collect the base location resource information and the base location state information by the same method as in the processing described so far, and transmit those pieces of information to the operation monitoring server 8 (Step S9-28 to Step S9-43).

In the change determination for the service request processing apparatus (Step S9-46), it is assumed to be determined that a given application on the robot 1 (21-1) needs to be caused to run on the APP control server 3.

The operation monitoring server 8 transmits, to the APP control server 3, an activation notification for the application being the change target for the apparatus on which the application program is executed (Step S9-49). The APP activation notification specifies the application identifier of the application to be activated. The APP control server 3 activates the specified application (Step S3-52).

After that, the operation monitoring server 8 transmits the server change notification to the robot 1 (21-1) (Step S9-55), and notifies the robot 1 (21-1) that the target application is being executed on the APP control server 3. The robot 1 (21-1) updates the APP coupling destination information DB 266 so that the coupling destination of the target application becomes the APP control server 3.

After that, the processing of the relevant application is conducted between the robot 1 (21-1) and the APP control server 3 through transmission and reception of messages (Step S9-58 and Step S9-61).

Figure 19:
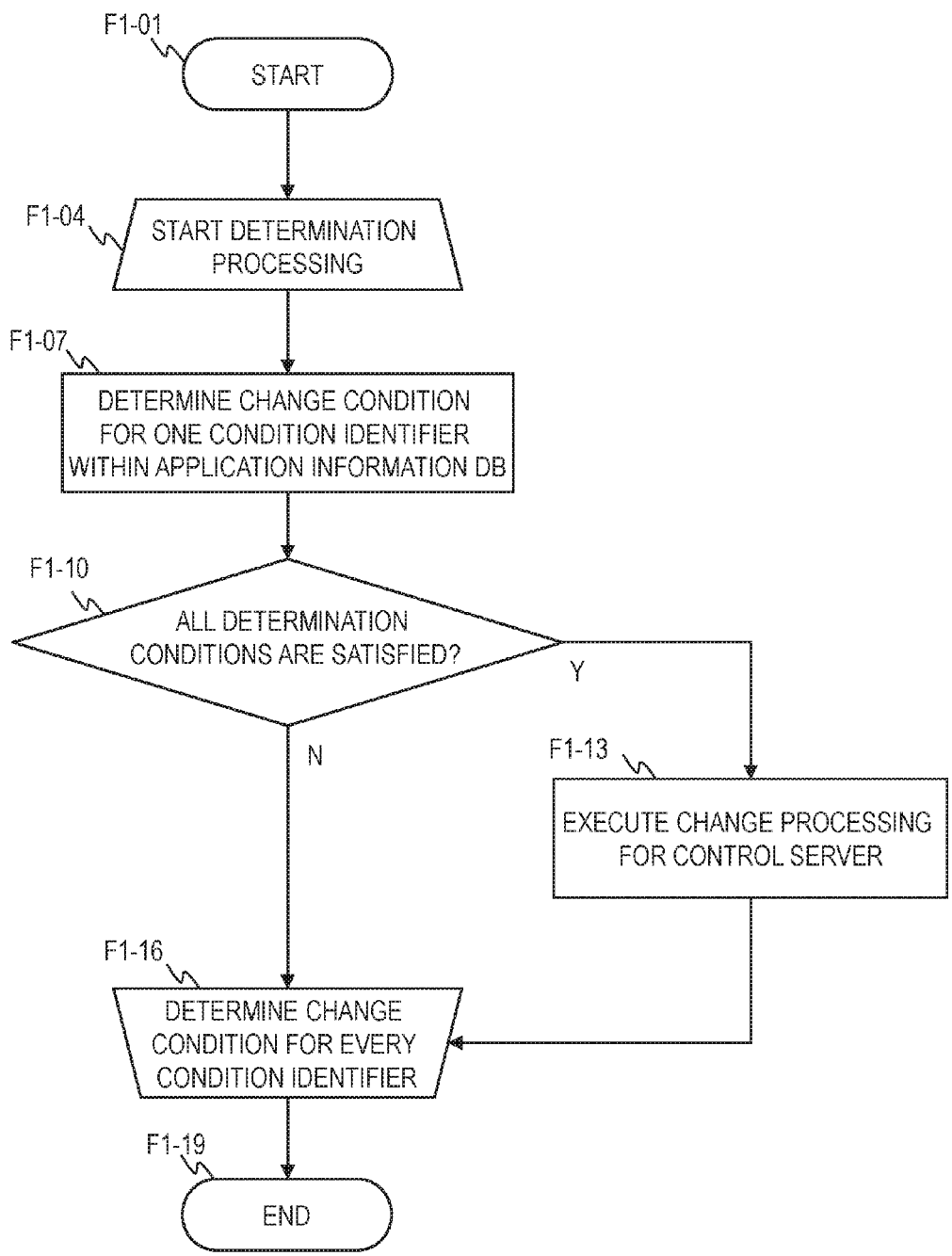
FIG. 19 is a flowchart for explaining an example of a method of determining a change of a service request processing apparatus.

Next, a determination method for the change of the service request processing apparatus conducted on the operation monitoring server 8 is described with reference to a flow chart of FIG. 19.

The change determination for the service request processing apparatus is conducted after the operation monitoring server 8 receives various kinds of information from the robot 21, the APP control server 3, and the central APP control server 7 (Step S3-37 and the like of FIG. 12). A method of periodically activating the determination processing is conceivable as a trigger for activation in addition to the checking of reception situations of the above-mentioned various kinds of information.

The determination processing for the change of the service request processing apparatus is conducted for all the condition identifiers managed in the application information DB 865 of the operation monitoring server 8 (Step F1-04). This processing can be achieved by acquiring a record corresponding to one given condition identifier from the application information DB 865 and executing the determination processing for the relevant record (Step F1-07).

In this case, the determination condition for the relevant record is used to conduct the determination processing for the change of the service request processing apparatus (Step F1-10). When all the determination conditions are satisfied, the change processing for the service request processing apparatus is executed (Step F1-13). Otherwise, the procedure returns to the head of a processing loop to conduct the determination for the change of the service request processing apparatus for a record corresponding to another condition identifier (Step F1-04 and Step F1-07).

When the determination processing is completed for the record corresponding to every condition identifier (Step F1-16), the processing for determining whether or not to change the service request processing apparatus is brought to an end (Step F1-19).

Various determination conditions are conceivable in the determination for the change of the service request processing apparatus.

FIG. 20 is an example of a determination condition edit screen for setting the determination condition. Items necessary to set the determination condition include an application name, the change type, the change direction, and a change determination condition. The application name needs to be capable of uniquely identifying the application, and is used as the APP identifier of the application information DB 865.

The change type is selected from the two values of "fixed" and "changeable". When the change type is "changeable", the direction of the change is selected and set. When the change type is "fixed", the base location in which the application is to be deployed is set. When "fixed" is selected, the relevant application is registered in the fixed APP list of the base location basic information DB 364.

The change determination condition is an item for determining the change condition for the service request processing apparatus, and a plurality of change determination conditions can be registered as the need arises. Items that can be set as the change determination conditions include the CPU usage rates and the consumed network bandwidths of the robot 21, the APP control server 3, and the central APP control server 7, the position of the robot 21, and the task for the place.

In regard to the determination method, the determination is conducted based on "equal to or larger than", "equal to or smaller than", or the like for a condition that can be expressed by a numerical value, while the determination is conducted based on details of a character string for a condition that can be expressed by a character string, for example, the place or the task details.

In the example of the task of serving a customer in the bank, when the robot 21 moves to a space for serving a customer and needs to serve the customer as its main task, the relevant service request processing apparatus is changed to the APP control server 3 even when a CPU load on the robot 21 is in a state of being as low as 10%.

In contrast, when the robot 21 leaves the space for serving a customer and no longer needs to serve the customer, a possibility of using the relevant application becomes lower, and hence even when the task of serving a customer in the bank occurs, the task is handled by the central APP control server 7, which can reduce the processing load on the APP control server 3.

The following items are conceivable as patterns and specific examples of changing the service request processing apparatus:

(1) from the APP control server 3 to the central APP control server 7, tasks are consolidated into the central APP control server 7 due to a low usage rate of an APP in a given base location, and tasks of serving a customer for nighttime are consolidated into the central APP control server 7 when the type of customers changes due to a time slot or when the usage rate of the APP is lowered due to a change of service contents;

(2) from the central APP control server 7 to the APP control server 3, tasks are conducted on the APP control server 3 due to a high usage rate of an APP coupled to a given base location, and normal tasks for business hours are conducted on the APP control server 3 when the type of customers changes due to the time slot or when the usage rate of the APP is raised due to a change of service contents;

(3) from the robot 21 to the APP control server 3, the applications are consolidated into the APP control server 3 to lower the processing load on the robot 21 when a plurality of robots 21 execute the same application in the same base location;

(4) from the APP control server 3 to the robot 21, an event reverse to (3) occurs;

(5) from the robot 21 to the central APP control server 7, the processing load on the robot 21 is reduced within a possible range in the base location in which the APP control server 3 does not exist; and (6) from the central APP control server 7 to the robot 21, when the robot 21 comes to be located in a place for providing a specific task, the application is executed on the robot for the purpose of reducing a response time.

The operation monitoring apparatus and the operation monitoring system, which have been described above, are expected to be applied to an operation monitoring service for integrally managing various devices existing in a large number of base locations.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. An operation monitoring server comprising:
a storage apparatus configured to store instructions; and
a processor configured to operate based on the instructions,
wherein the processor is configured to:
acquire state information on at least one of a monitoring target device or a base location in which the monitoring target device is placed; and
select, based on the acquired state information, one of a plurality of service request processing apparatus each having a function of processing a service request received from the monitoring target device;
the plurality of service request processing apparatus comprise a first service request processing apparatus; and
the processor is configured to:
acquire resource information on at least one of the monitoring target device or the base location in which the first service request processing apparatus is placed; and
select the one of the plurality of service request processing apparatus, which is to serve the monitoring target device, based on the state information and the acquired resource information.

2. The operation monitoring server according to claim 1, wherein the processor is configured to acquire the state information and the resource information on the monitoring target device through the first service request processing apparatus coupled to the monitoring target device by a network.

3. The operation monitoring server according to claim 1, wherein:
the processor is configured to acquire the state information on the base location through the first service request processing apparatus coupled to the monitoring target device by a network.

4. An operation monitoring server comprising:
a storage apparatus configured to store instructions; and
a processor configured to operate based on the instructions,
wherein the processor is configured to:
acquire state information on at least one of a monitoring target device or a base location in which the monitoring target device is placed; and
select, based on the acquired state information, one of a plurality of service request processing apparatus each having a function of processing a service request received from the monitoring target device;
when the selected one of the plurality of service request processing apparatus is different from an active one of the plurality of service request processing apparatus registered in the monitoring target device, the processor notifies the monitoring target device that the active one of the plurality of service request processing apparatus is to be changed.

5. The operation monitoring server according to claim 4, wherein the processor is configured to instruct, after the notification of the change, the active one of the plurality of service request processing apparatus to stop the function of processing the service request, which is being executed on the active one of the plurality of service request processing apparatus.

6. The operation monitoring server according to claim 4, wherein the processor is configured to instruct, before the notification of the change, one of the plurality of service request processing apparatus, which is to serve the monitoring target device after the change, to activate the function of processing the service request.

7. The operation monitoring server according to claim 4, wherein:
the plurality of service request processing apparatus comprise a first service request processing apparatus coupled to the monitoring target device by a network, and a second service request processing apparatus coupled to the operation monitoring server by the network; and the active one of the plurality of service request processing apparatus and one of the plurality of service request processing apparatus, which is to serve the monitoring target device after the change, each comprise any one of the monitoring target device, the first service request processing apparatus, and the second service request processing apparatus.

8. An operation monitoring system, wherein at least one of a monitoring target device or a service request processing apparatus having a function of processing a service request received from the monitoring target device is placed in each of a plurality of base locations coupled to one another by a network, the operation monitoring system comprising:
  an operation monitoring server placed in a base location of the plurality of base locations and configured to monitor operations of monitoring target devices placed in the plurality of base locations; and
  service request processing apparatus placed in the plurality of base locations, comprising a first service request processing apparatus placed in one of the plurality of base locations in which a first monitoring target device is placed, wherein:
  the first monitoring target device is configured to transmit state information on the first monitoring target device to the operation monitoring server, or the first service request processing apparatus is configured to transmit state information on the one of the plurality of base locations to the operation monitoring server; and
  the operation monitoring server is configured to:
    acquire the transmitted state information; and
    select, based on the acquired state information, one of a plurality of service request processing apparatus each having a function of processing a service request received from the first monitoring target device.

9. The operation monitoring system according to claim 8, wherein the first monitoring target device is configured to transmit the state information on the first monitoring target device to the operation monitoring server, and the first service request processing apparatus is configured to transmit the state information on the one of the plurality of base locations to the operation monitoring server.

10. The operation monitoring system according to claim 8, wherein:
  at least one of the first monitoring target device or the first service request processing apparatus is configured to transmit resource information on the at least one of the first monitoring target device or the first service request processing apparatus to the operation monitoring server; and
  the operation monitoring server is configured to:
    acquire the transmitted resource information; and
    select the one of the plurality of service request processing apparatus, which is to serve the first monitoring target device, based on the state information and the acquired resource information.

11. The operation monitoring system according to claim 8, wherein, when the selected one of the plurality of service request processing apparatus is different from an active one of the plurality of service request processing apparatus registered in the first monitoring target device, the operation monitoring server notifies the first monitoring target device that the active one of the plurality of service request processing apparatus is to be changed.

12. The operation monitoring system according to claim 11, wherein the operation monitoring server is configured to instruct, after the notification of the change, the active one of the plurality of service request processing apparatus to stop the function of processing the service request, which is being executed on the active one of the plurality of service request processing apparatus.

13. The operation monitoring system according to claim 11, wherein the operation monitoring server is configured to instruct, before the notification of the change, one of the plurality of service request processing apparatus, which is to serve the first monitoring target device after the change, to activate the function of processing the service request.

14. The operation monitoring system according to claim 9, wherein:
  the first monitoring target device is configured to transmit the state information and the resource information to the first service request processing apparatus coupled to the first monitoring target device by a network;
  the first service request processing apparatus is configured to transmit the state information and the resource information, which have been received, to the operation monitoring server; and
  the operation monitoring server is configured to receive the state information and the resource information on the first monitoring target device from the first service request processing apparatus.

15. The operation monitoring system according to claim 8, wherein:
  the first service request processing apparatus coupled to the first monitoring target device by the network is configured to transmit the state information on the one of the plurality of base locations to the operation monitoring server; and
  the operation monitoring server is configured to receive the state information on the one of the plurality of base locations from the first service request processing apparatus.

16. The operation monitoring system according to claim 11, wherein:
  the plurality of service request processing apparatus comprise a second service request processing apparatus coupled to the operation monitoring server by a network;
  the active one of the plurality of service request processing apparatus is one of the first service request processing apparatus coupled to the first monitoring target device by a network and the second service request processing apparatus; and
  one of the plurality of service request processing apparatus which is to serve the first monitoring target device after the change is the other one of the first service request processing apparatus coupled to the first monitoring target device by a network and the second service request processing apparatus.

* * * * *